(12) United States Patent
Wexler et al.

(10) Patent No.: US 10,432,841 B2
(45) Date of Patent: Oct. 1, 2019

(54) WEARABLE APPARATUS AND METHOD FOR SELECTIVELY CATEGORIZING INFORMATION DERIVED FROM IMAGES

(71) Applicant: OrCam Technologies Ltd., Jerusalem (IL)

(72) Inventors: Yonatan Wexler, Jerusalem (IL); Amnon Shashua, Mevaseret Zion (IL)

(73) Assignee: OrCam Technologies, Ltd., Jerusalem (IL)

( * ) Notice: Subject to any disclaimer, the term of this patent is extended or adjusted under 35 U.S.C. 154(b) by 505 days.

(21) Appl. No.: 14/807,055

(22) Filed: Jul. 23, 2015

(65) Prior Publication Data

US 2016/0026873 A1 Jan. 28, 2016

Related U.S. Application Data

(60) Provisional application No. 62/027,957, filed on Jul. 23, 2014, provisional application No. 62/027,936, filed on Jul. 23, 2014.

(51) Int. Cl.
*H04N 5/225* (2006.01)
*G06F 1/18* (2006.01)
(Continued)

(52) U.S. Cl.
CPC ......... *H04N 5/2259* (2013.01); *G01S 3/7864* (2013.01); *G02B 27/0093* (2013.01); *G02B 27/017* (2013.01); *G06F 1/163* (2013.01); *G06F 1/1686* (2013.01); *G06F 1/18* (2013.01); *G06F 1/188* (2013.01); *G06F 3/005* (2013.01); *G06F 3/011* (2013.01); *G06F 3/012* (2013.01); *G06F 3/017* (2013.01); *G06F 3/0304* (2013.01); *G06F 3/038* (2013.01); *G06F 16/51* (2019.01); *G06F 16/53* (2019.01); *G06F 16/532* (2019.01); *G06K 9/00201* (2013.01); *G06K 9/00208* (2013.01); *G06K 9/00221* (2013.01);
(Continued)

(58) Field of Classification Search
CPC ... G02B 27/0093; G06F 1/163; G06F 1/1686; G06Q 30/0246; G06Q 30/0257; G06Q 30/0267; G06Q 30/0269; G06T 2207/10004; H04N 5/2259
USPC .......................................................... 348/158
See application file for complete search history.

(56) References Cited

U.S. PATENT DOCUMENTS

| 9,101,279 | B2* | 8/2015 | Ritchey | G03B 37/00 |
| 2016/0350868 | A1* | 12/2016 | Votaw | G06Q 40/12 |
| 2017/0206420 | A1* | 7/2017 | She | G06Q 50/01 |

* cited by examiner

*Primary Examiner* — William C Vaughn, Jr.
*Assistant Examiner* — Jae N Noh
(74) *Attorney, Agent, or Firm* — Finnegan, Henderson, Farabow, Garrett & Dunner LLP

(57) ABSTRACT

A wearable apparatus and method are provided for selectively categorizing information derived from images. In one implementation, a wearable apparatus for collecting information related to activities of a user may collect information related to activities of a user. The wearable apparatus may include an image sensor configured to capture a plurality of images from an environment of a user; a communications interface; and at least one processing device. The at least one processing device may be programmed to process the plurality of images to identify an activity occurring in the environment of the user; associate the activity with an activity category; and cause transmission of at least the activity category to a remotely located computing device via the communications interface.

25 Claims, 23 Drawing Sheets

(51) Int. Cl.

| | |
|---|---|
| *G06F 16/532* | (2019.01) |
| *G02B 27/00* | (2006.01) |
| *G02B 27/01* | (2006.01) |
| *G06F 3/01* | (2006.01) |
| *G06Q 30/02* | (2012.01) |
| *H04N 5/232* | (2006.01) |
| *H04N 7/18* | (2006.01) |
| *G06F 1/16* | (2006.01) |
| *G06F 3/00* | (2006.01) |
| *G06F 3/038* | (2013.01) |
| *H04N 5/235* | (2006.01) |
| *G06K 9/00* | (2006.01) |
| *G06T 7/20* | (2017.01) |
| *H04N 5/44* | (2011.01) |
| *G01S 3/786* | (2006.01) |
| *H04N 1/21* | (2006.01) |
| *G06K 9/62* | (2006.01) |
| *G06F 3/03* | (2006.01) |
| *G06T 7/00* | (2017.01) |
| *G06T 7/73* | (2017.01) |
| *G06F 16/53* | (2019.01) |
| *G06F 16/51* | (2019.01) |

(52) U.S. Cl.
CPC ..... *G06K 9/00288* (2013.01); *G06K 9/00335* (2013.01); *G06K 9/00624* (2013.01); *G06K 9/00671* (2013.01); *G06K 9/00677* (2013.01); *G06K 9/00718* (2013.01); *G06K 9/6262* (2013.01); *G06Q 30/0246* (2013.01); *G06Q 30/0257* (2013.01); *G06Q 30/0267* (2013.01); *G06Q 30/0269* (2013.01); *G06T 7/20* (2013.01); *G06T 7/74* (2017.01); *G06T 7/97* (2017.01); *H04N 1/2112* (2013.01); *H04N 5/2251* (2013.01); *H04N 5/2252* (2013.01); *H04N 5/2254* (2013.01); *H04N 5/2257* (2013.01); *H04N 5/2258* (2013.01); *H04N 5/2353* (2013.01); *H04N 5/23206* (2013.01); *H04N 5/23216* (2013.01); *H04N 5/23219* (2013.01); *H04N 5/23229* (2013.01); *H04N 5/23245* (2013.01); *H04N 5/23258* (2013.01); *H04N 5/44* (2013.01); *H04N 7/183* (2013.01); *H04N 7/185* (2013.01); *G02B 2027/014* (2013.01); *G02B 2027/0138* (2013.01); *G02B 2027/0178* (2013.01); *G02B 2027/0187* (2013.01); *G06F 2203/011* (2013.01); *G06K 2209/21* (2013.01); *G06K 2209/25* (2013.01); *G06T 2207/10004* (2013.01); *G06T 2207/10016* (2013.01); *G06T 2207/30232* (2013.01)

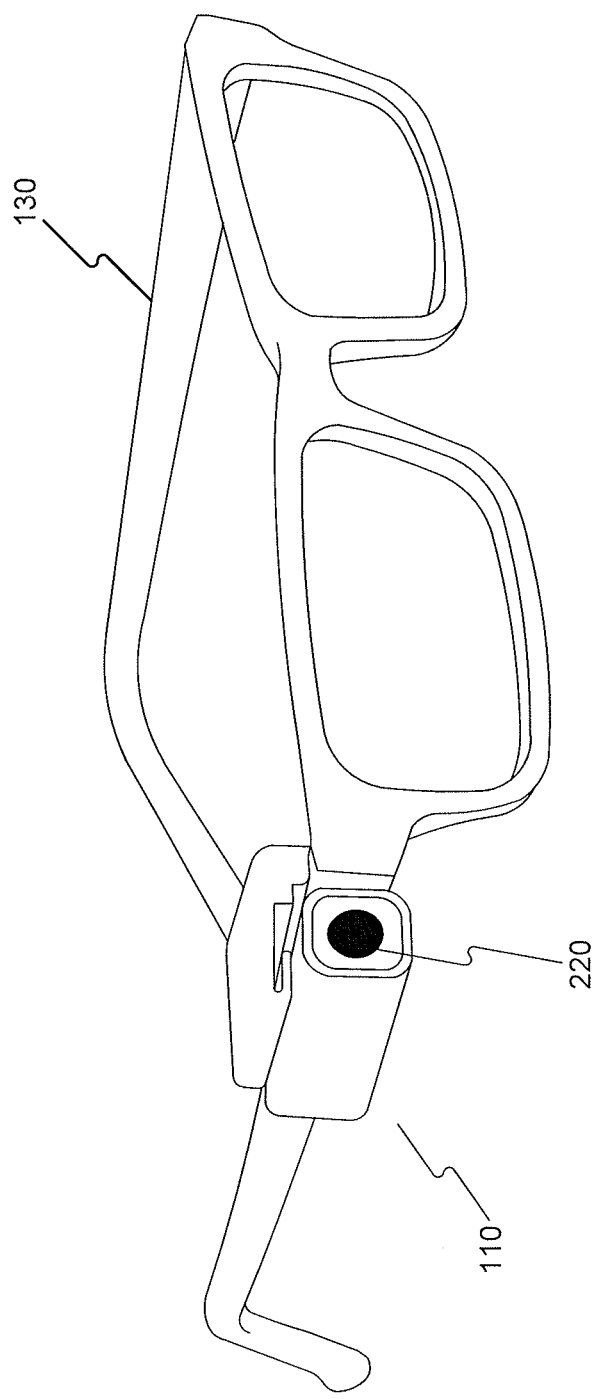

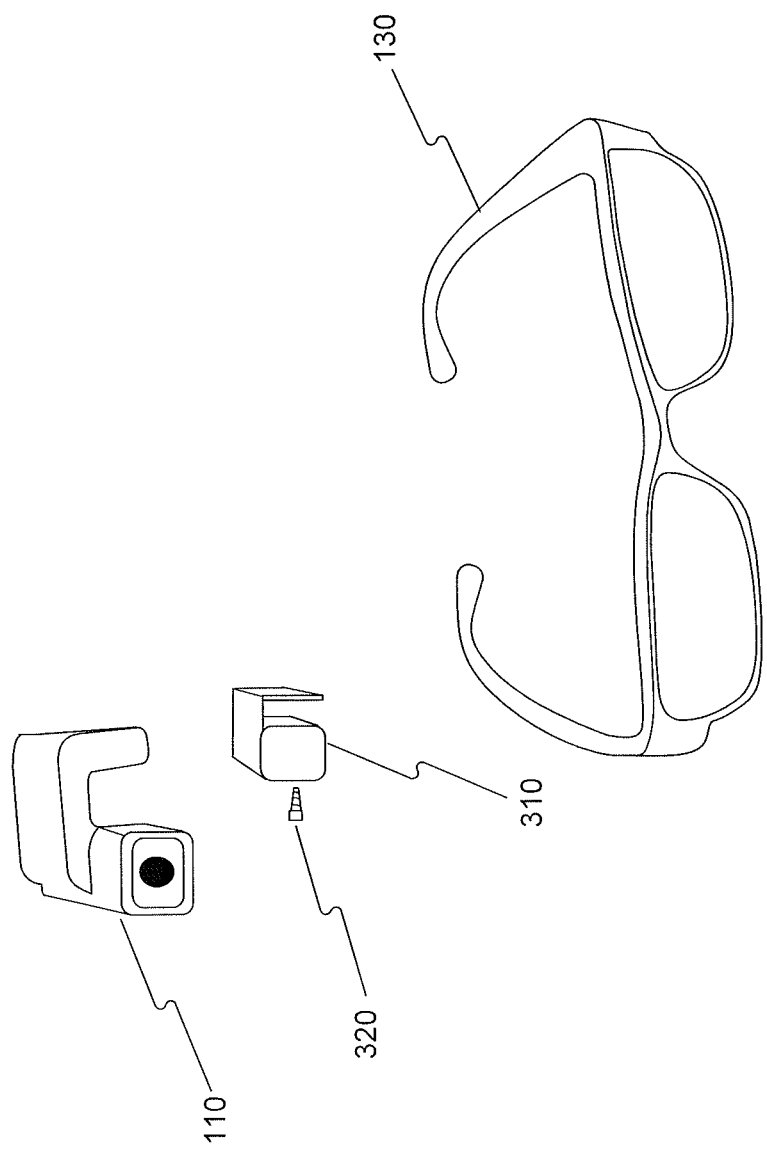

WEARABLE APPARATUS AND METHOD FOR SELECTIVELY CATEGORIZING INFORMATION DERIVED FROM IMAGES

CROSS REFERENCES TO RELATED APPLICATIONS

This application claims the benefit of priority of U.S. Provisional Patent Application No. 62/027,936, filed on Jul. 23, 2014, and U.S. Provisional Patent Application No. 62/027,957, filed on Jul. 23, 2014, all of which are incorporated herein by reference in their entirety.

BACKGROUND

I. Technical Field

This disclosure generally relates to devices and methods for capturing and processing images from an environment of a user. More particularly, this disclosure relates to devices and methods for selectively categorizing information derived from images.

II. Background Information

Today, technological advancements make it possible for wearable devices to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data.

Even though users can capture images with their smartphones and some smartphone applications can process the captured images, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment. Therefore, there is a need for apparatuses and methods for automatically capturing and processing images in a manner that provides useful information to users of the apparatuses.

SUMMARY

Embodiments consistent with the present disclosure provide an apparatus and methods for selectively categorizing information derived from images.

In accordance with a disclosed embodiment, a wearable apparatus for collecting information related to activities of a user is provided. The wearable apparatus includes an image sensor configured to capture a plurality of images from an environment of a user. The wearable apparatus includes a communications interface and at least one processing device. The at least one processing device is programmed to process the plurality of images to identify an activity occurring in the environment of the user. The at least one processing device is also programmed to associate the activity with an activity category. The at least one processing device is further programmed to cause transmission of at least the activity category to a remotely located computing device via the communications interface.

Consistent with another disclosed embodiment, a wearable apparatus for collecting information related to activities of a user is provided. The wearable apparatus includes an image sensor configured to capture a plurality of images from an environment of a user. The wearable apparatus also includes a communications interface and at least one processing device. The at least one processing device is programmed to process the plurality of images to identify an activity occurring in the environment of the user. The at least one processing device is also programmed to access profile information related to the user, and determine, based on the profile information, that images of the activity are to be included in a life log. The at least one processing device is also programmed to transmit at least one of the plurality of images of the activity to a remotely located computing device via the communications interface for inclusion in the life log.

Consistent with yet another disclosed embodiment, a method for collecting information related to activities of a user is provided. The method includes capturing, via an image sensor included in a wearable apparatus, a plurality of images from an environment a user of the wearable apparatus. The method also includes processing the plurality of images to identify an activity occurring in the environment of the user. The method also includes associating the activity with an activity category. The method further includes transmitting the activity category to a remotely located computing device.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 3A is a schematic illustration of an example of the wearable apparatus shown in FIG. 1A.

FIG. 3B is an exploded view of the example of the wearable apparatus shown in FIG. 3A.

DETAILED DESCRIPTION

Figure 1A:
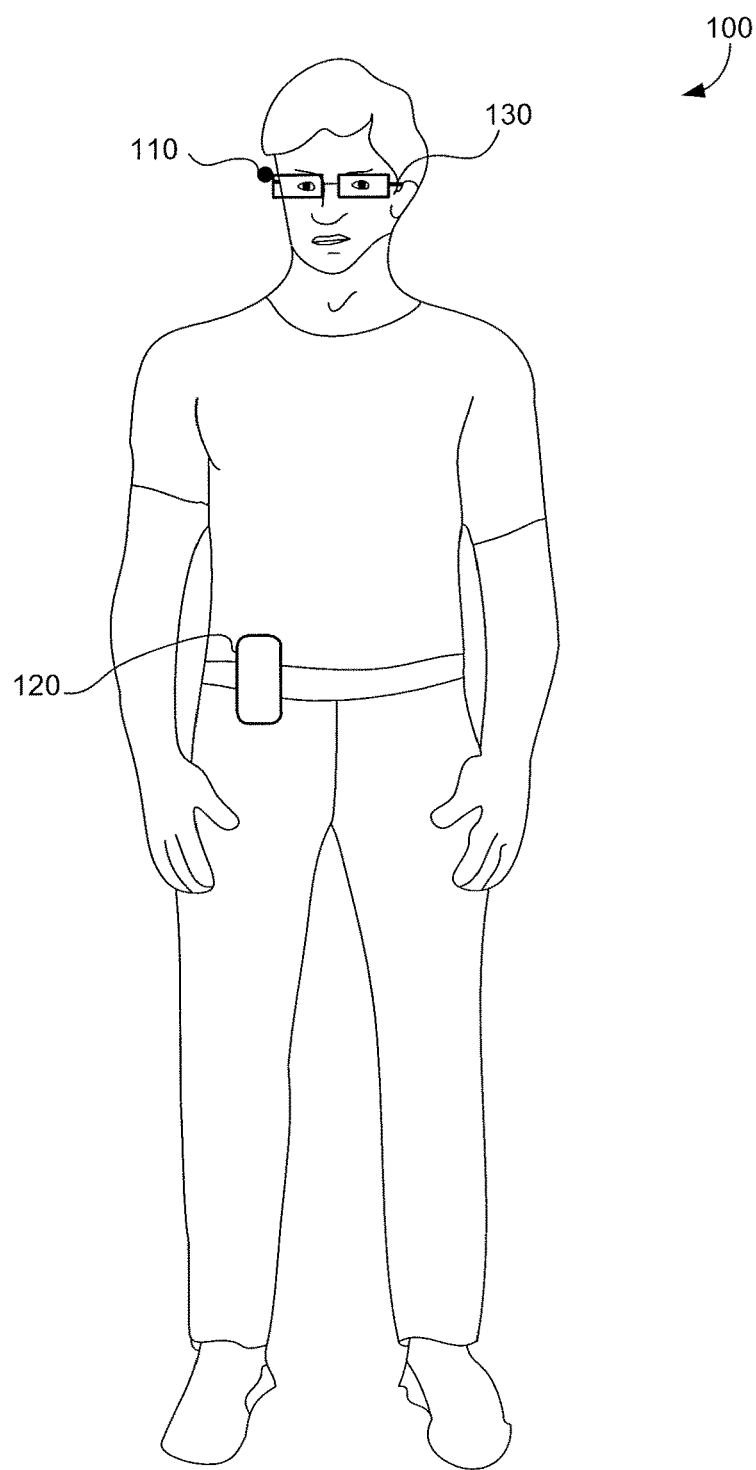
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or more lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
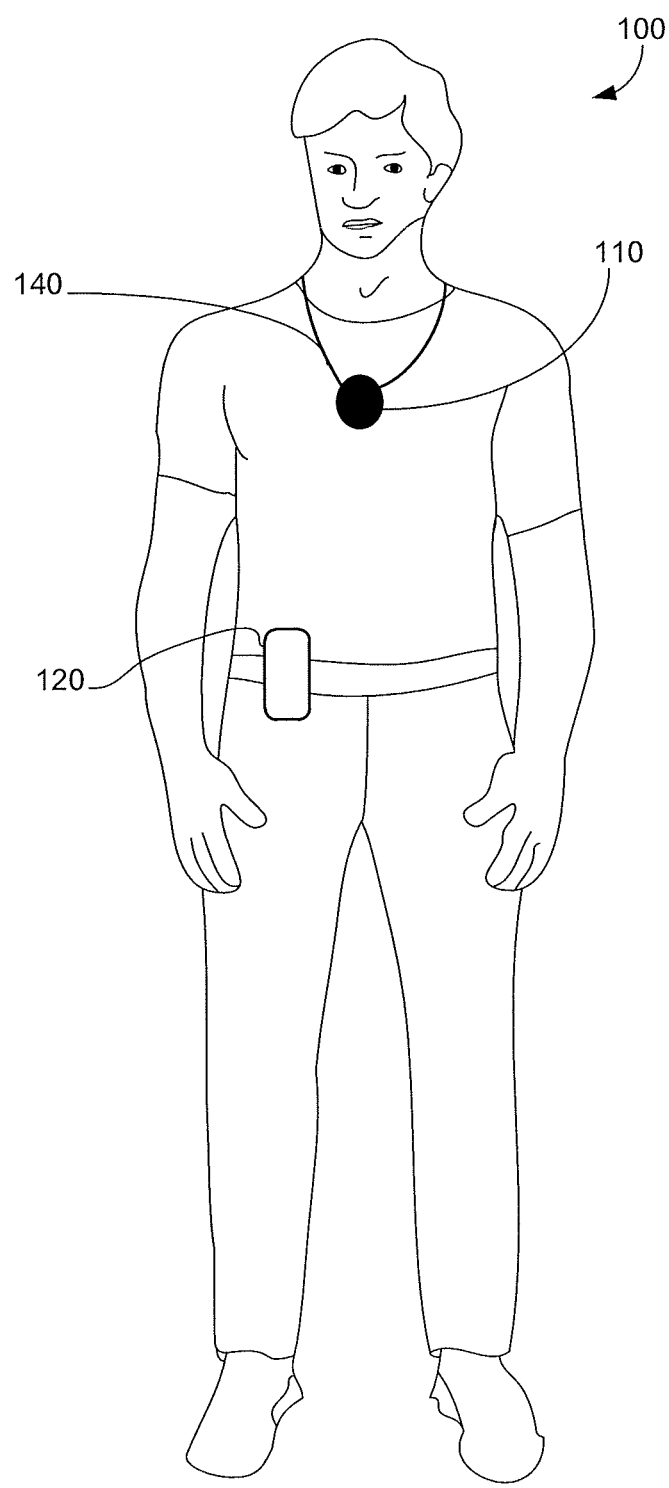
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
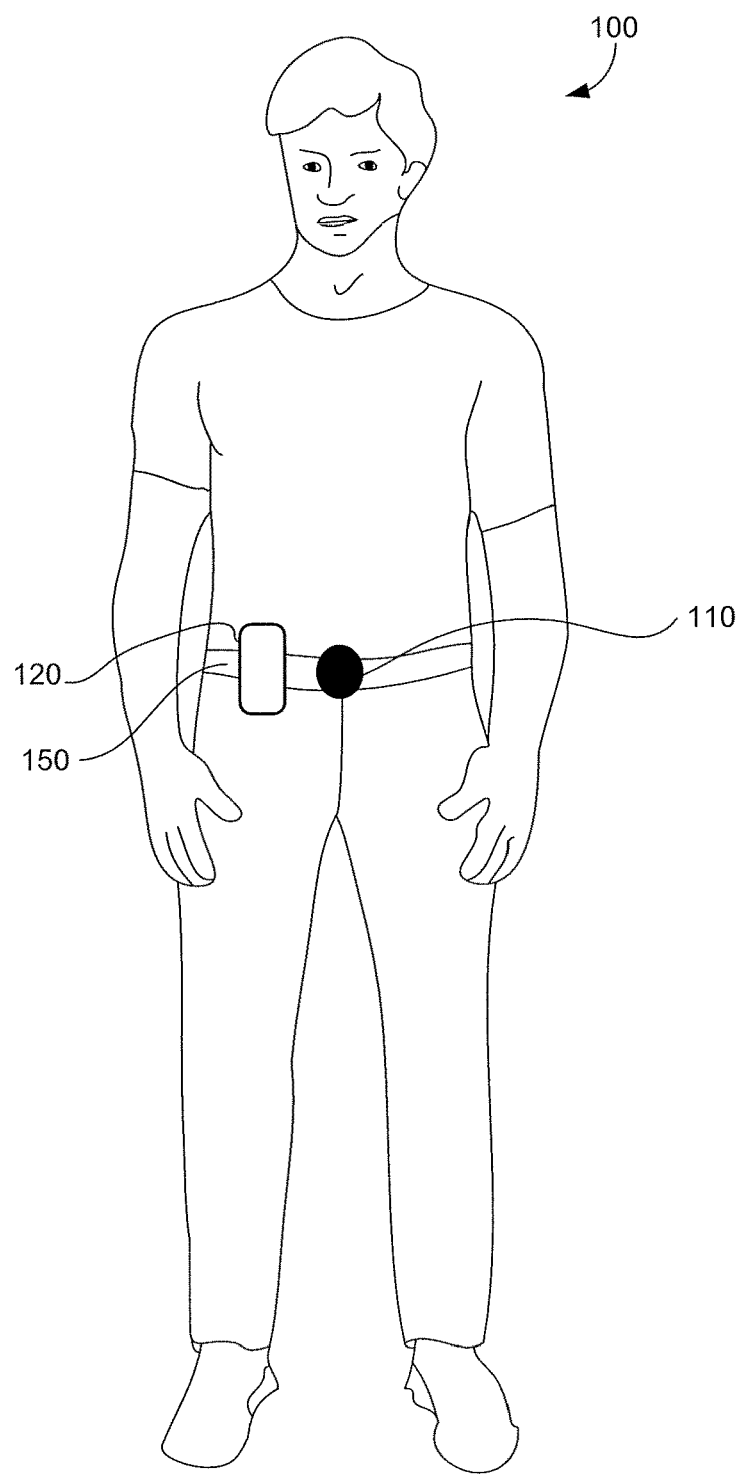
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
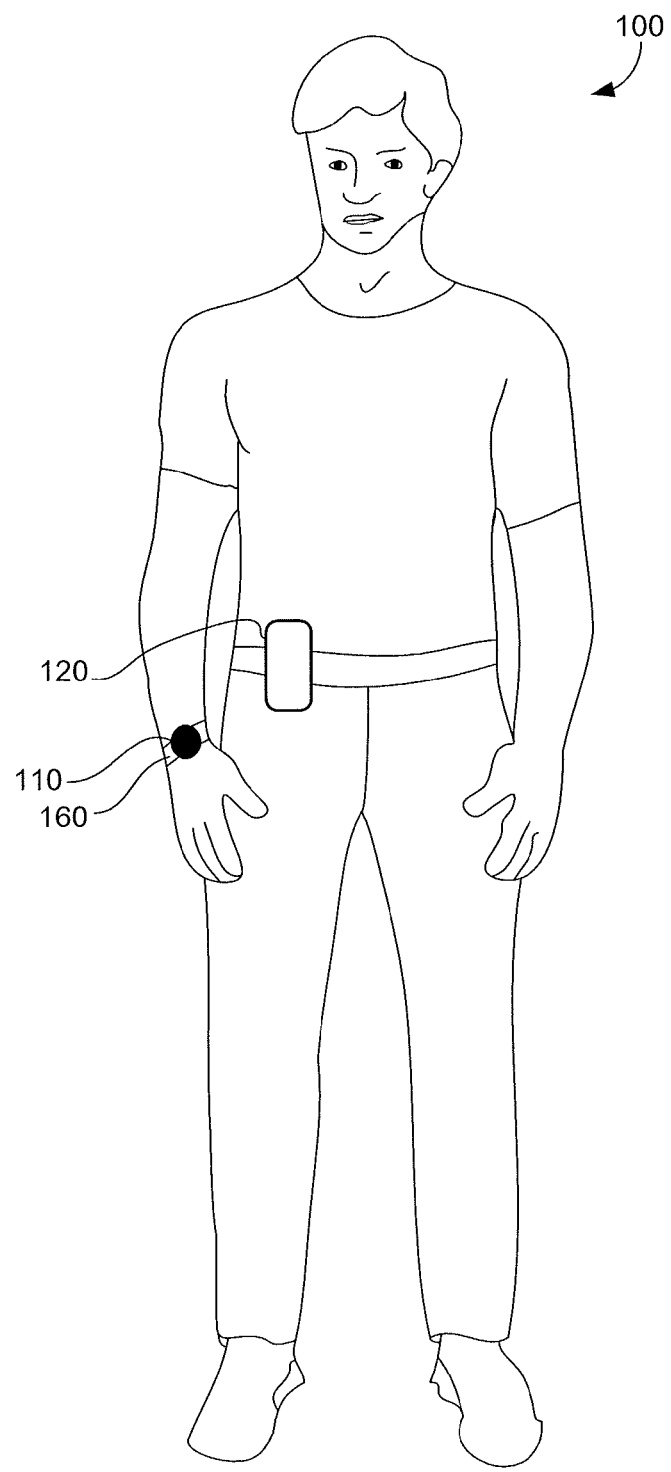
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

Figure 2:
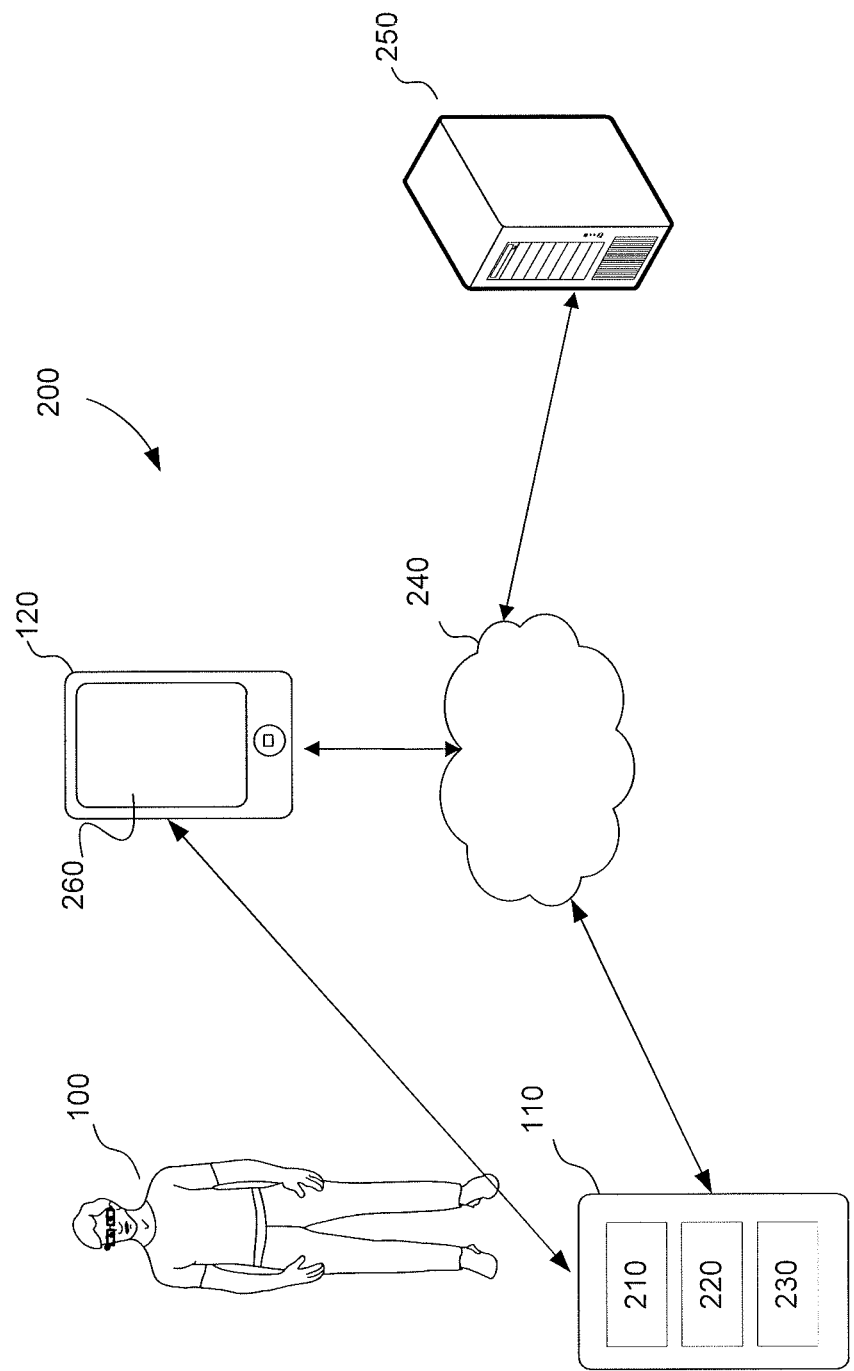
FIG. 2 is a schematic illustration of an example system consistent with the disclosed embodiments.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-field capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

An example wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

Figure 4A:
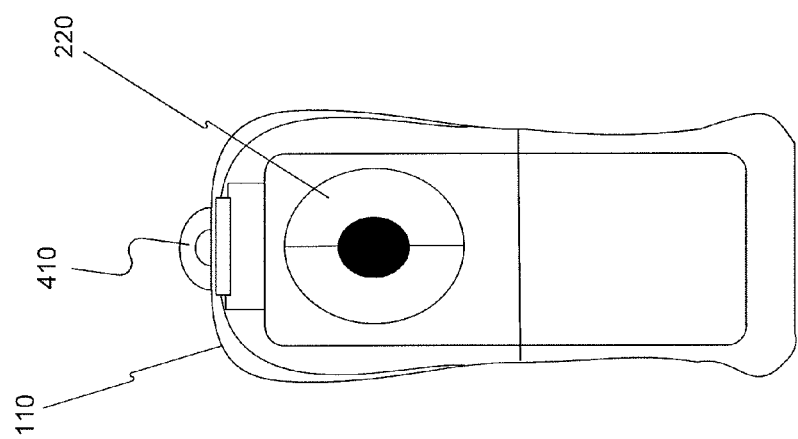
FIG. 4A is a schematic illustration of an example of the wearable apparatus shown in FIG. 1B from a first viewpoint.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a first viewpoint. The viewpoint shown in FIG. 4A is from the front of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

Figure 4B:
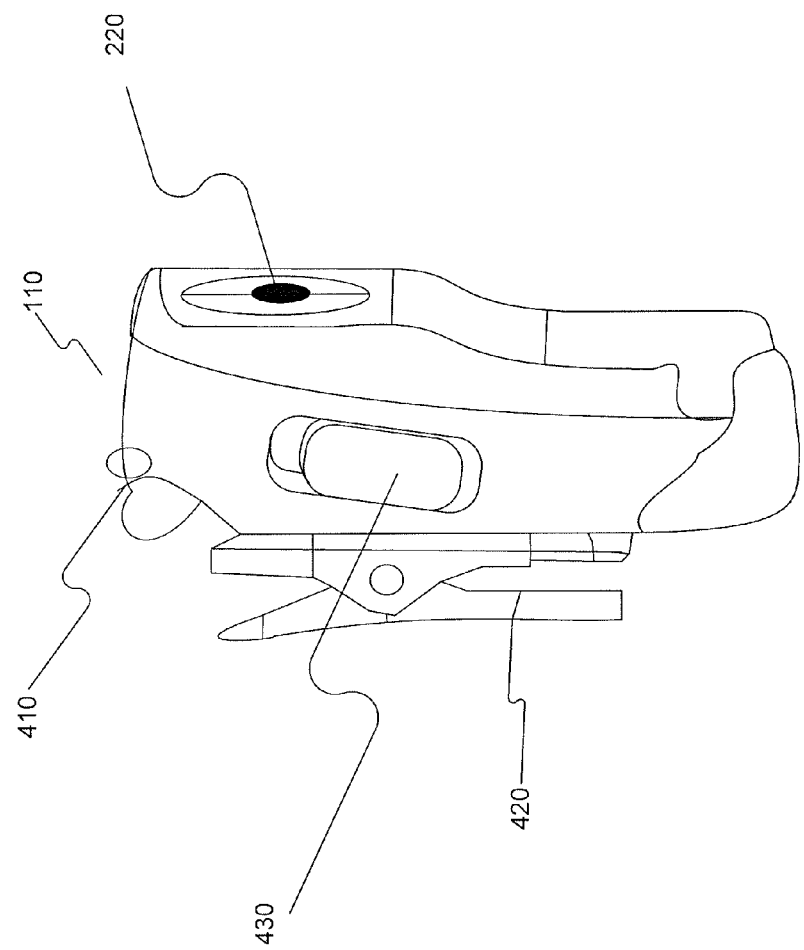
FIG. 4B is a schematic illustration of the example of the wearable apparatus shown in FIG. 1B from a second viewpoint.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
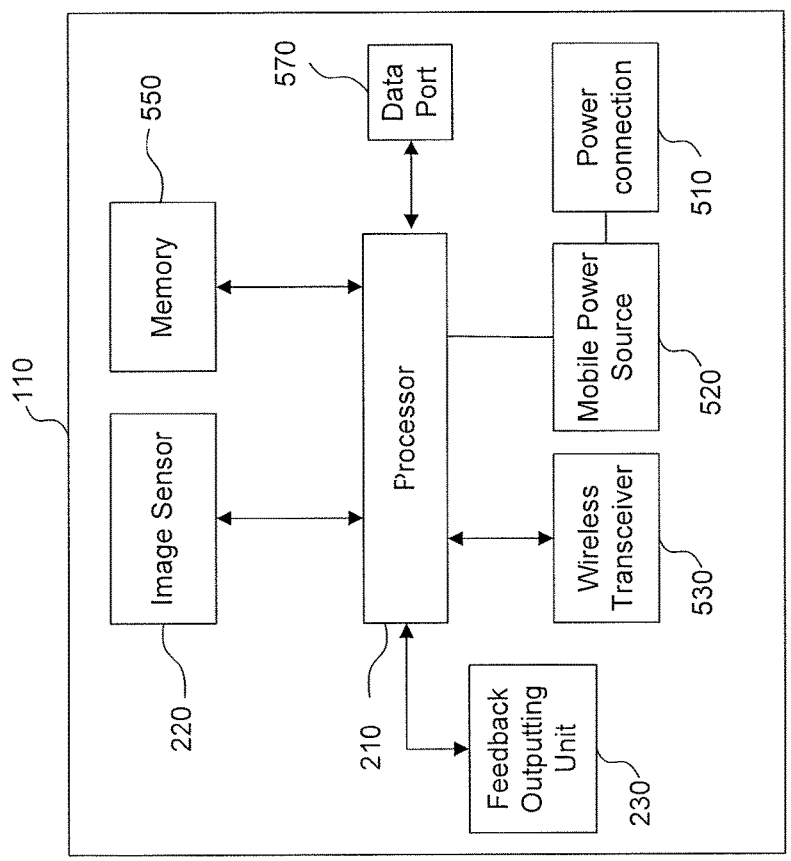
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 510 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

Figure 5B:
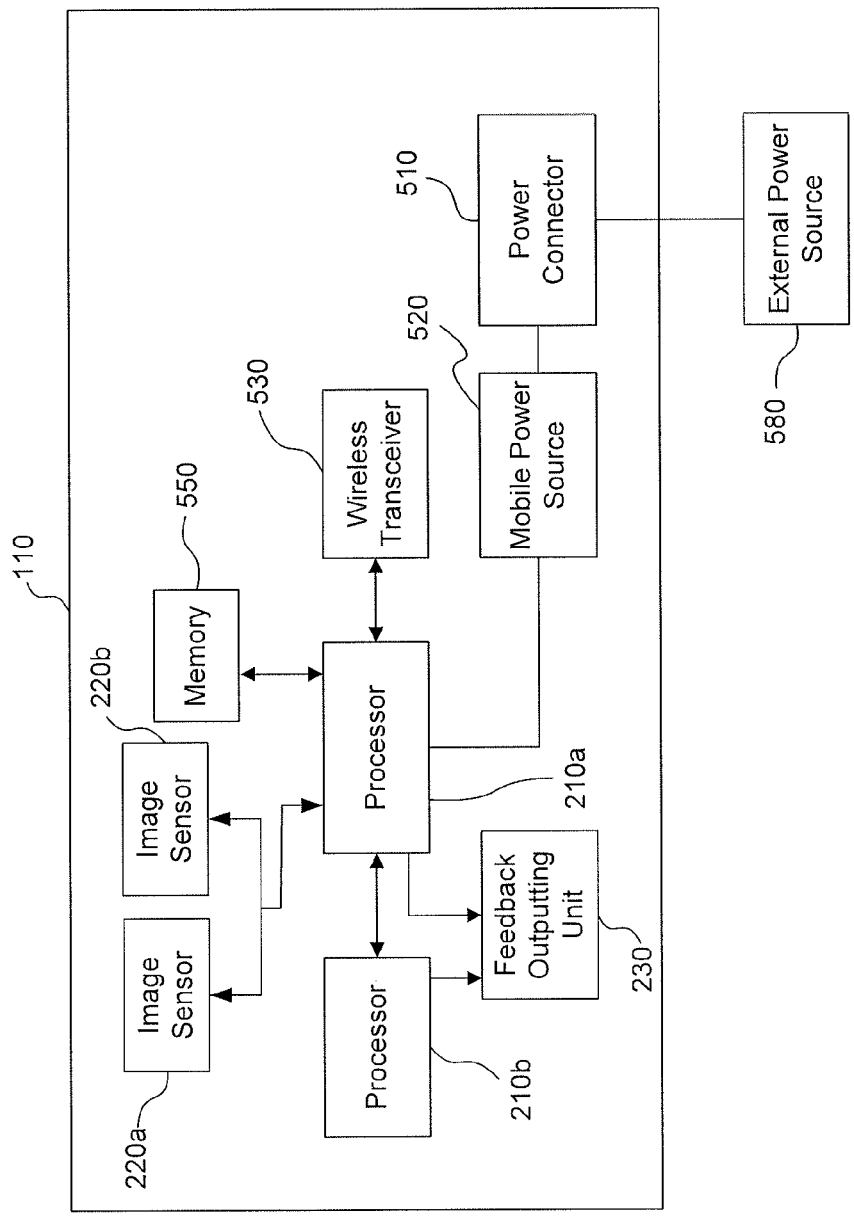
FIG. 5B is a block diagram illustrating an example of the components of a wearable apparatus according to a second embodiment.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback-outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identified hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 5C:
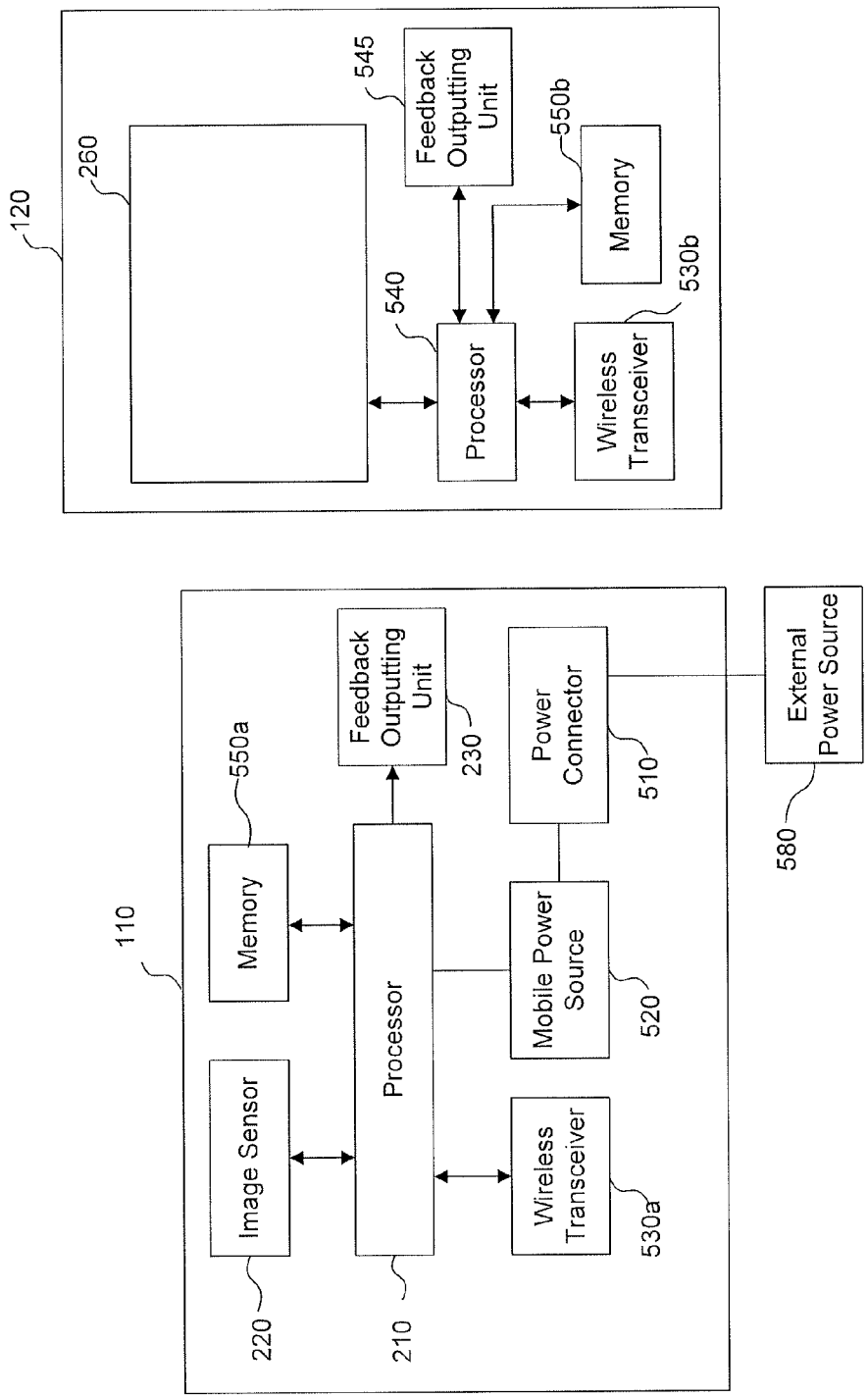
FIG. 5C is a block diagram illustrating an example of the components of a wearable apparatus according to a third embodiment.

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. Therefore, the foregoing configurations are examples and, regardless of the configurations discussed above, apparatus 110 can capture, store, and process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

Wearable apparatus 110 may be configured to capture images from an environment of user 100 through a wearable image sensor, such as image sensor 220, 220a, and/or 220b. One or more images captured by wearable apparatus 110 may show what activities user 100 has been engaged or involved in. At least one processing device, such as processor 210 and/or processor 540 may be programmed to perform various processes on the captured images to identify an activity occurring in the environment of user 100. For example, the processing device may identify, from the captured images, that user 100 is or has engaged in a sport activity (e.g., playing soccer game), a music activity (e.g., attending a concert), or a transit activity (e.g., riding a bus). The processing device may associate the activity with an activity category, such as sports, music, transit, etc. The processing device may cause transmission of at least the activity category to a remotely located computing device (e.g., computing device 120 and/or server 250 that may be remotely located and in communication with wearable apparatus 110 via network 240) via a communications interface. The communication interface may include wireless transceiver 530 and/or 530b. The communication interface may include other suitable communication means configured to transmit and receive data including, for example, one or more wired connections.

In some embodiments, the processing device may be programmed to determine a location (e.g., a soccer field, a GPS address, a street address, etc.) at which the activity (e.g., soccer game, music lesson, shopping activity) occurred and to transmit the location to the computing device via the communications interface. In some embodiments, the processing device may transmit at least one of the plurality of images depicting the activity (e.g., soccer game) to the computing device.

In some embodiments, the processing device may cause the computing device to display a life log including the at least one of the plurality of images depicting the activity in association with the activity category. The remotely located computing device may be located at, e.g., a doctor's office or an activity tracking center. The life log may show the doctor or an activity monitoring operator what activities user 100 has been or is engaged in. The life log may show activities under different activity categories.

In some embodiments, the processing device may determine an elapsed time of the activity, and transmit the elapsed time to the computing device. For example, the processing device may determine, from a plurality of images captured by the image sensors of wearable apparatus 110, the amount of time has elapsed relating to an activity (e.g., 30 minutes has elapsed for user 100 engaging in a soccer game). The processing device may transmit the 30 minutes elapsed time to the computing device, such that, for example, the doctor or the activity monitoring operator may track the amount of time of the activity in which user 100 has engaged or is performing.

In some embodiments, the processing device may determine an interest level of user 100 regarding an activity category (e.g., sports). The interest level may be quantified (e.g., represented by numbers). For example, the interest level may be represented by any integer number ranging from 1 to 5, which a higher number indicating a higher interest level. Other methods, such as symbols, alphabets, etc., may also be used to represent interest levels. In some embodiments, the processing device may determine the interest level based on at least the elapsed time of the activity.

In some embodiments, the processing device may determine a number of activities associated with one or more activity categories that were performed by the user over a time period. For example, the processing device may process a plurality of images captured by the image sensors to determine the number of activities, such as the number of sports (basketball, soccer, ping pong, etc.) associated with the sports category that were performed by user 100 over the last day, week, or month. As another example, the processing device may determine the number of music activities, such as playing piano, playing drum, attending concert, which are associated with the music category that were performed by user 100 over the last day, week, or month.

In some embodiments, the processing device may select a recommendation for user 100 based on at least the activity category. For example, the processing device may select a schedule of a soccer game in two days as a recommendation based on information derived from captured images indicating that indicates user 100 is interested in the activity category of sports.

In some embodiments, the processing device may select at least one of an advertisement and a coupon for presenting to the user based on at least the activity category. For example, based on information derived from the captured images indicating that user 100 is interested in the activity category of sports, the processing device may select an advertisement and/or a coupon relating to a sales event of a soccer shirt of a local team.

In some embodiments, the processing device may receive at least one of an advertisement and a coupon for presenting to the user based on at least the activity category. For example, the processing device may transmit information regarding the activities user 100 has performed or is performing, and/or the activity category associated with the activities user 100 has performed or is performing, to server 250. Server 250 may analyze the information regarding activities and/or activity category, and based on the analysis, select an advertisement and/or a coupon relating to sales of the soccer shirt of the local team as recommended information to present to user 100. Server 250 may transmit the recommended information (or recommendation) to the processing device. The processing device may transmit the recommended information to a device user 100 is also carrying, such as computing device 120, and cause computing device 120 to display the advertisement and/or coupon to user 100.

In some embodiments, the processing device may transmit information regarding the activities user 100 has performed or is performing, and/or the activity category associated with the activities user 100 has performed or is performing to computing device 120 and/or server 250. Computing device and/or server 250 may analyze the information regarding activities and/or activity category, and based on the analysis, select an advertisement and/or a coupon relating to sales of a soccer shirt of the local team as recommended information to presented to user 100. Computing device and/or server 250 may transmit the recommended information (or recommendation) to the processing device. The processing device may output the advertisement and/or coupon as an audio message through feedback outputting unit 230.

Figure 6:
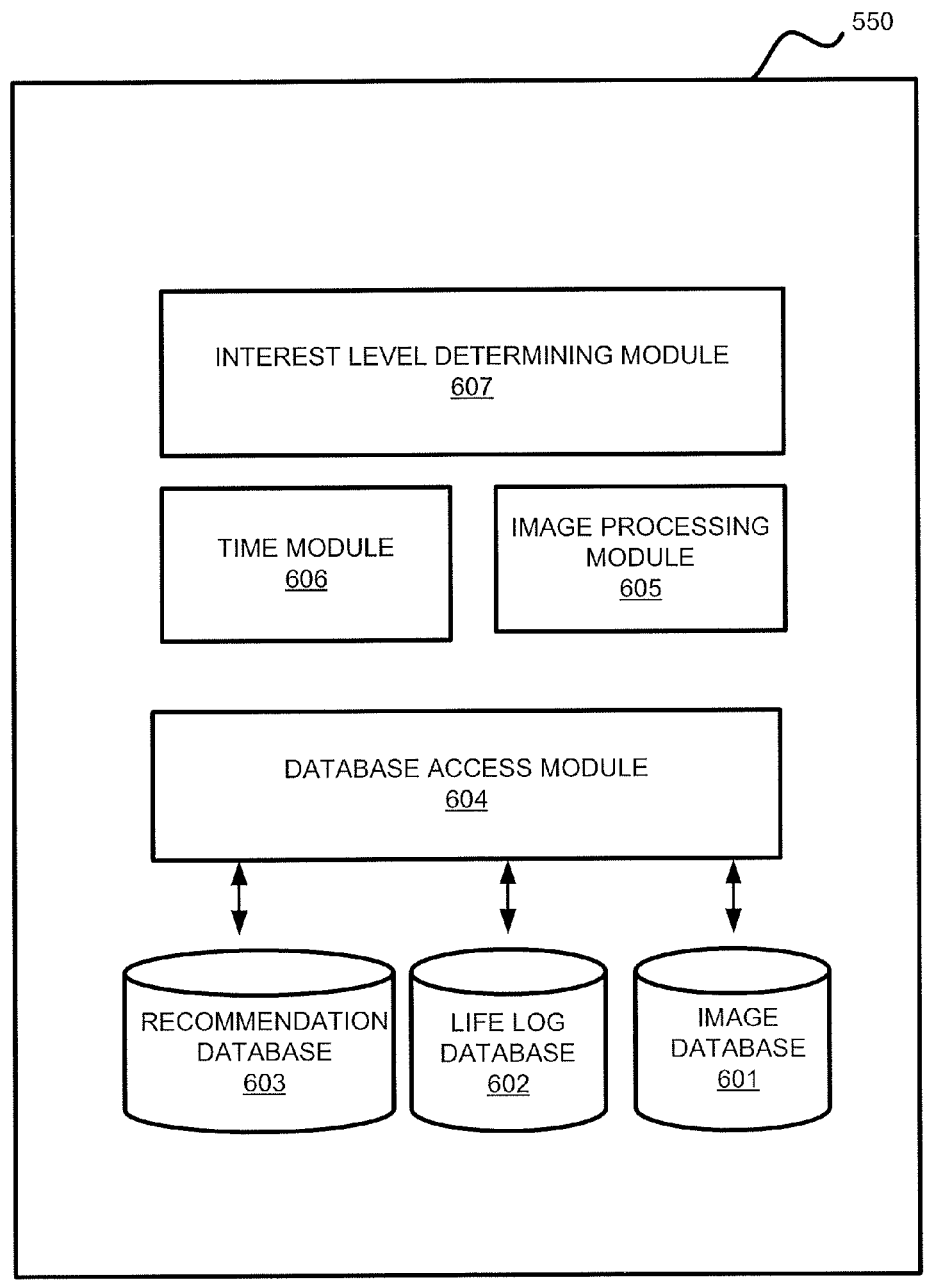
FIG. 6 is a block diagram illustrating an example memory storing a plurality of modules and databases.

FIG. 6 is a block diagram illustrating a memory (e.g., memory 550, 550*a*, and/or 550*b*) according to the disclosed embodiments. The memory may include one or more modules or sets of instructions, which when executed by at least one processing device, carry out methods consistent with the disclosed embodiments. For example, the memory may include instructions executable by the at least one processing device to process or analyze images captured by the image sensors. In some embodiments, the processing device may be included in wearable apparatus 110. For example, the processing device may include processor 210, 210*a*, and/or 210*b* shown in FIGS. 5A and 5B. The processing device may process the image data captured by the image sensors in near real time, as the image data are being captured by the image sensors. In some embodiments, the processing device may include a processor that is separately located from wearable apparatus 110. The processing device may include a processor that is remotely connected with wearable apparatus 110 through network 240, which may be a wired or wireless network, or through any other connectivity means, such as Bluetooth, near field communication (NFC), etc. For example, the processing device may include processor 540 included in computing device 120, which may be connected with wearable apparatus 110 through a wired or wireless connection, such as through a cable, Bluetooth, WiFi, infrared, or near field communication (NFC). In some embodiments, the processing device may include a processor included in server 250, which may be wirelessly connected with wearable apparatus 110 through network 240. In some embodiments, the processing device may include a cloud computing processor remotely and wirelessly connected with wearable apparatus 110 through network 240. Wearable apparatus 110 may transmit captured image data to the processing device in near real time, and the processing device may process the captured image data and provide results of processing to wearable apparatus 110 in near real time. Further, in some embodiments, one or more databases and one or more modules may be located remotely from wearable apparatus 110 (e.g., included in computing device 120 and/or server 250).

In the example shown in FIG. 6, memory 550 includes or stores an image database 601, a life log database 602, and a recommendation database 603. Memory 550 may also include a database access module 604, an image processing module 605, a time module 606, and an interest level determining module 607. Additional or fewer databases and/or modules may be included in memory 550. The modules and databases shown in FIG. 6 are examples, and a processor in the disclosed embodiments may operate according to any suitable process.

In the embodiment shown in FIG. 6, memory 550 is configured to store an image database 601. Image database 601 may be configured to store various images, such as images (or image data) captured by an image sensor (e.g., image sensor 220, 220*a*, and/or 220*b*), which may depict activities user 100 has performed or is performing. Image database 601 may also be configured to store data other than image data, such as textual data, audio data, video data, etc. For example, image database 601 may be configured to store information related to the images, such as location information, date and time information, an identity of an object identified in the images, textual descriptions of activities user 100 has performed, etc.

In the example shown in FIG. 6, memory 550 is also configured to store a life log database 602. Life log database 602 may be configured to store various life logs. The life log may include data regarding the activities performed by user 100 in his or her life. For example, the life log may include a plurality of images depicting the activities, such as images captured during a sports game user 100 has involved. The life log may include descriptions of the activities, such as the location, date, time, and duration related to the activities. The life log may also include activity category information. In some embodiments, each life log may record information relating to the activities associated with a particular activity category. In some embodiments, the processing device of wearable apparatus 110 may cause images captured while user 100 is performing an activity to be saved in a life log in near real time.

Memory 550 is also configured to store a recommendation database 603. Recommendation database 603 may be configured to store one or more predefined recommendations to be presented to user 100. The recommendations to be presented to user 100 may be based on activities user 100 has performed or is performing, and/or the associated activity category. For example, the recommendations may include a recommendation of soccer, basketball, ping pong associated with the sports activity category. In some embodiments, the recommendations may include an advertisement and/or a coupon based on the activities user 100 has performed or is performing, and/or the associated activity category. For example, the advertisement and/or coupon may relate to a merchant bearing a logo of a local soccer team, and may be associated to the sports activity category.

As shown in FIG. 6, memory 550 is also configured to store a database access module 604. The processing device may execute instructions associated with database access module 604 to access image database 601, life log database 602, and recommendation database 603, for example, to retrieve previously stored image data, a life log, and/or recommendations. The processing device may also execute instructions associated with database access module 604 to store image data in image database 601, life logs in life log database 602, and recommendations in recommendation database 603.

In the embodiment shown in FIG. 6, memory 550 is configured to store an image processing module 605. The processing device may execute instructions associated with image processing module 605 to perform various analyses and processes of image data captured by the image sensors. For example, the processing device may execute instructions associated with image processing module 605 to identify an activity occurring in the environment of user 100. The processing device may execute instructions associated with image processing module 605 to associate the activity with an activity category. A plurality of activity categories may be stored in image database 601 or other databases included in memory 550.

In the embodiment shown in FIG. 6, memory 550 is configured to store a time module 606. The processing device may execute instructions associated with time module 606 to determine an elapsed time of an activity (e.g., soccer game), or a date and time an image is captured.

In the embodiment shown in FIG. 6, memory 550 is configured to store an interest level determining module 607. The processing device may execute instructions associated with interest level determining module 607 to determine an interest level of user 100 in an activity (e.g., soccer game) or an activity category (e.g., sports). In some embodiments, the interest level of user 100 in an activity or an activity category may be determined, by the processing device, based on at least the elapsed time of the activity, as determined from the images depicting the activity. For example, the processing device may determine from the captured images depicting a soccer game, that user 100 has a high interest level in soccer games because the images indicate that user 100 played the soccer game for over an hour. Other information included in the images may also be used to determine the interest level of user 100. For example, if images show that user 100 has watched a soccer game on TV for two hours, the processing device may determine that user 100 has a high interest level in soccer games.

Figure 7:
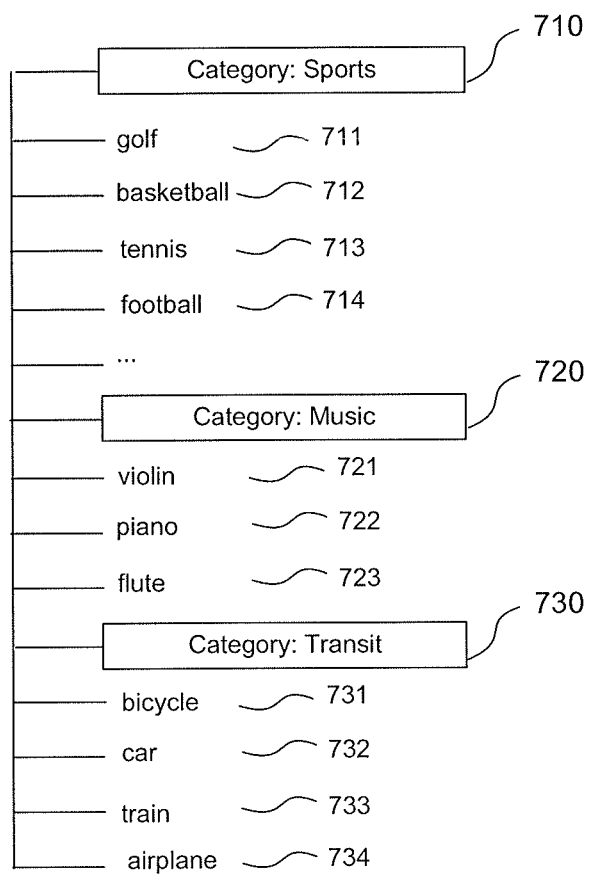
FIG. 7 is a schematic illustration of activity categories and associated activities.

FIG. 7 is a schematic illustration of activity categories and associated activities. These categories may be stored in image database 601 or any other database included in memory 550. The categories may include a first category 710 of sports, a second category 720 of music, and a third category 730 of transit. Other categories, such as outdoor activity, indoor activity, may also be stored in image database 601. First category 710 may include various sports, such as (playing) golf 711, (playing) basketball 712, (playing) tennis 713, and (playing) football 714. First category 710 may also include other sports, such as horse racing. Second category 720 may include various activities related to music. For example, second category 720 may include (playing) violin 721, (playing) piano 722, and (playing) flute 723. Other music activities, such as attending concert, may also be included. Third category 730 may include various activities relating to transit. For example, third category 730 may include (riding) bicycle 731, (driving) car 732, (riding) train 733, and (flying) airplane 734. Other activities relating to transit, such as taking a cruise, may also be included.

Figure 8:
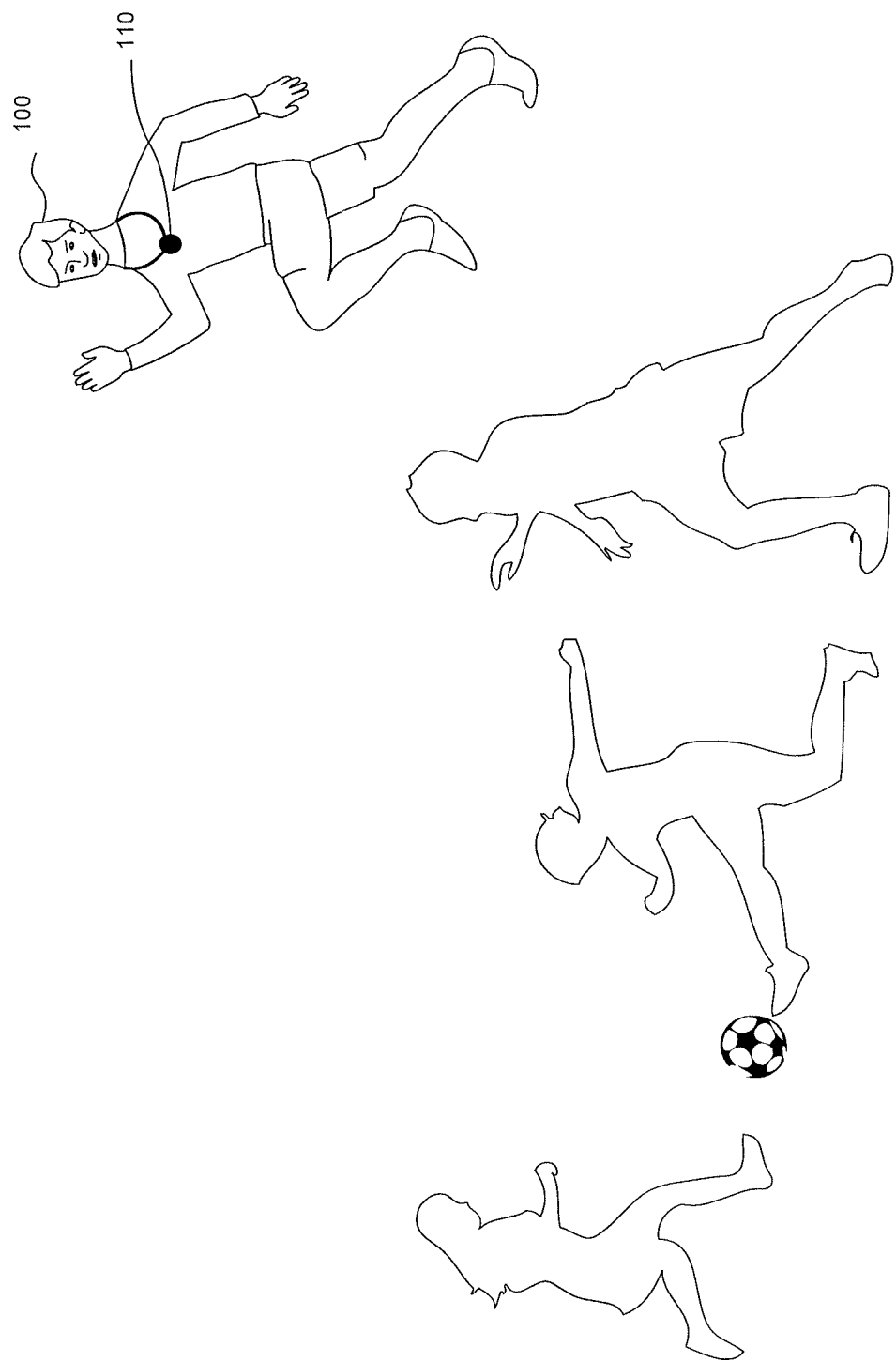
FIG. 8 shows an example environment including a wearable apparatus for capturing and processing images.

FIG. 8 shows an example environment including wearable apparatus 110 for capturing and processing images. User 100 may wear wearable apparatus 110 on his or her neck. User 100 may be playing a soccer game with other players. Wearable apparatus 110 may capture a plurality of images depicting the soccer game while user 100 is playing the game. The images depicting the activity user 100 has performed or is performing may be included in a life log saved in life log database 602. In some embodiments, user 100 may be watching other players playing the soccer game, and may capture images relating to the soccer game using wearable apparatus 110. The images may reflect that user 100 is watching a soccer game rather than playing the soccer game. For example, the images may reflect that they are captured from a same static point of view, indicating that user 100 is watching rather than playing the soccer game.

Figure 9:
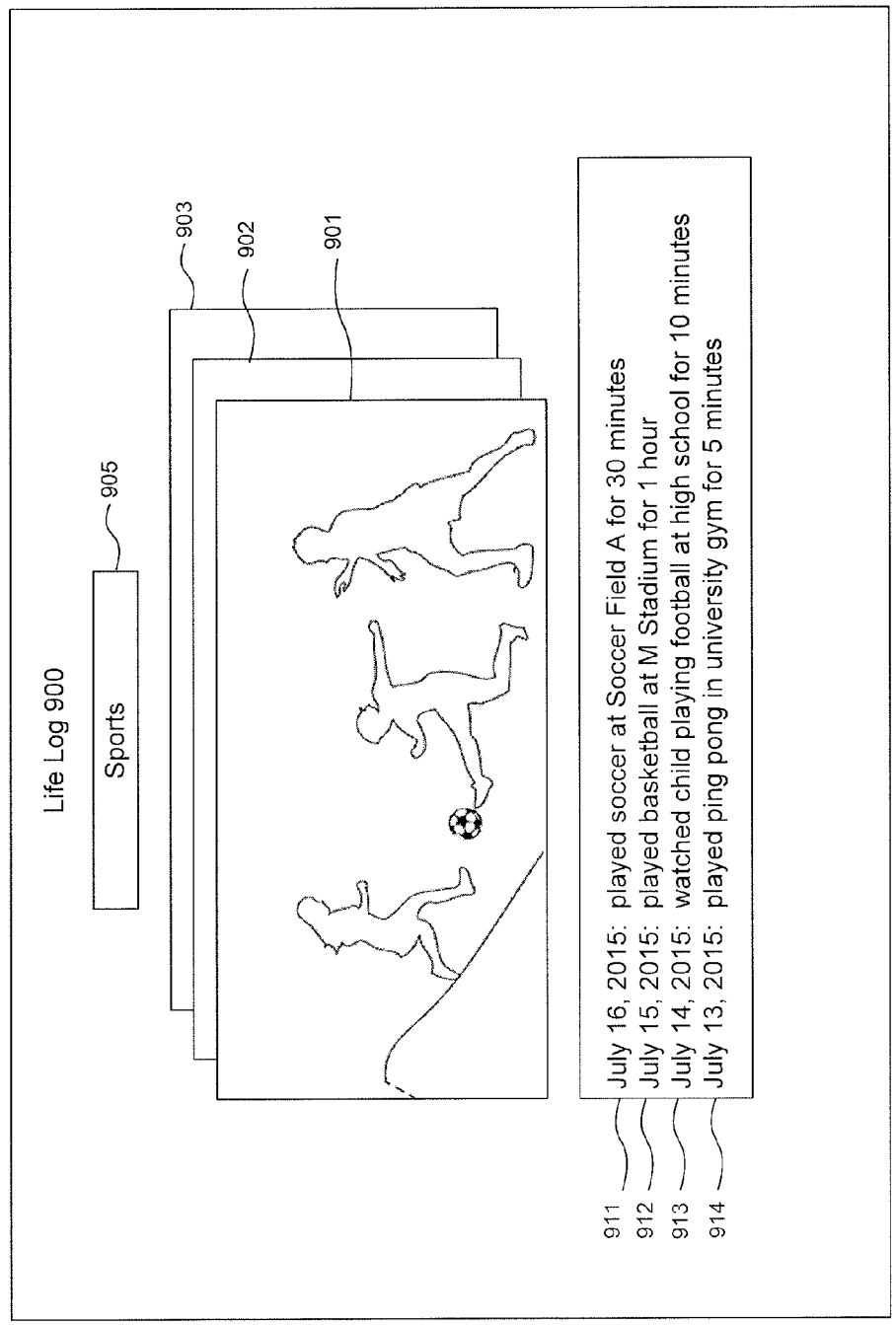
FIG. 9 shows an example life log that stores or records information relating to activities a user has performed or is performing.

FIG. 9 shows an example life log that stores or records information relating to activities user 100 has performed or is performing. For example, life log 900 may record or store information relating to activities associated with an activity category of sports 905 that user 100 has performed or is performing. Life log 900 may be in the form of an electronic folder, which may include files, such as image files relating to activities user 100 has performed or is performing, as captured by wearable apparatus 110. Life log 900 may also include text, such as descriptions of image files and/or activities. Life log 900 may be stored in life log database 602, and may be read or retrieved by the processing device. Life log 900 may be transmitted from life log database 602 to other devices for analysis and/or display, such as computing device 120 and/or server 250. For example, user 100 or another person, such as a doctor or an activity monitoring operator may view life log 900 to learn what activities user 100 has performed during a day, a week, a month, a year, etc. In the embodiment shown in FIG. 9, life log 900 includes a plurality of images 901, 902, 903 depicting sports related activities user 100 has performed. Life log 900 may also include images depicting activities user 100 has not performed but watched. Life log 900 may also include a plurality of textual entries 911-914 describing activities user 100 has performed, or otherwise captured using wearable apparatus 110. Information included in the textual entries 911-914 may include date, time, a description of the activity (including location and a duration of time the activity lasts), etc.

Figure 10:
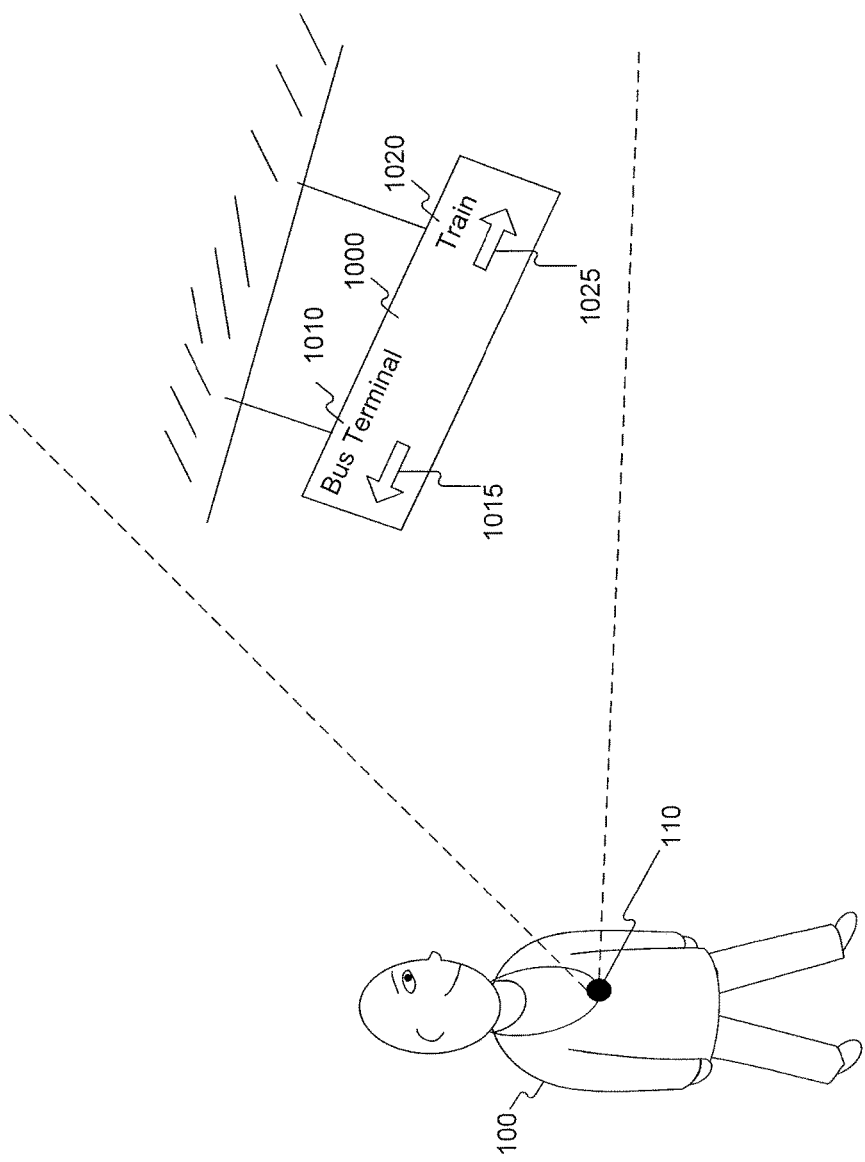
FIG. 10 shows an example environment including a wearable apparatus for capturing and processing images.

FIG. 10 shows an example environment including wearable apparatus 110 for capturing and processing images. User 100 may wear wearable apparatus 110 on his or her neck. User 100 may be in a transit center, walking to catch a bus or a train. In some embodiments, wearable apparatus 110 may capture a plurality of images of the transit center as user 100 walks through the transit center. For example, wearable apparatus 110 may capture an image of a direction sign 1000, which may include text label 1010 indicating "Bus Terminal" and text label 1020 indicating "Train." An arrow 1015 may be associated with text label 1010 instructing user 100 to turn left to go to a bus terminal. An arrow 1025 may be associated with text label 1020 instructing user 100 to turn right to go to a train station. User 100 may turn left to go to the bus terminal, take a ride on a bus to go to a destination. Along the trip, wearable apparatus 110 may continue capturing images to record the activities user 100 has performed.

Figure 11:
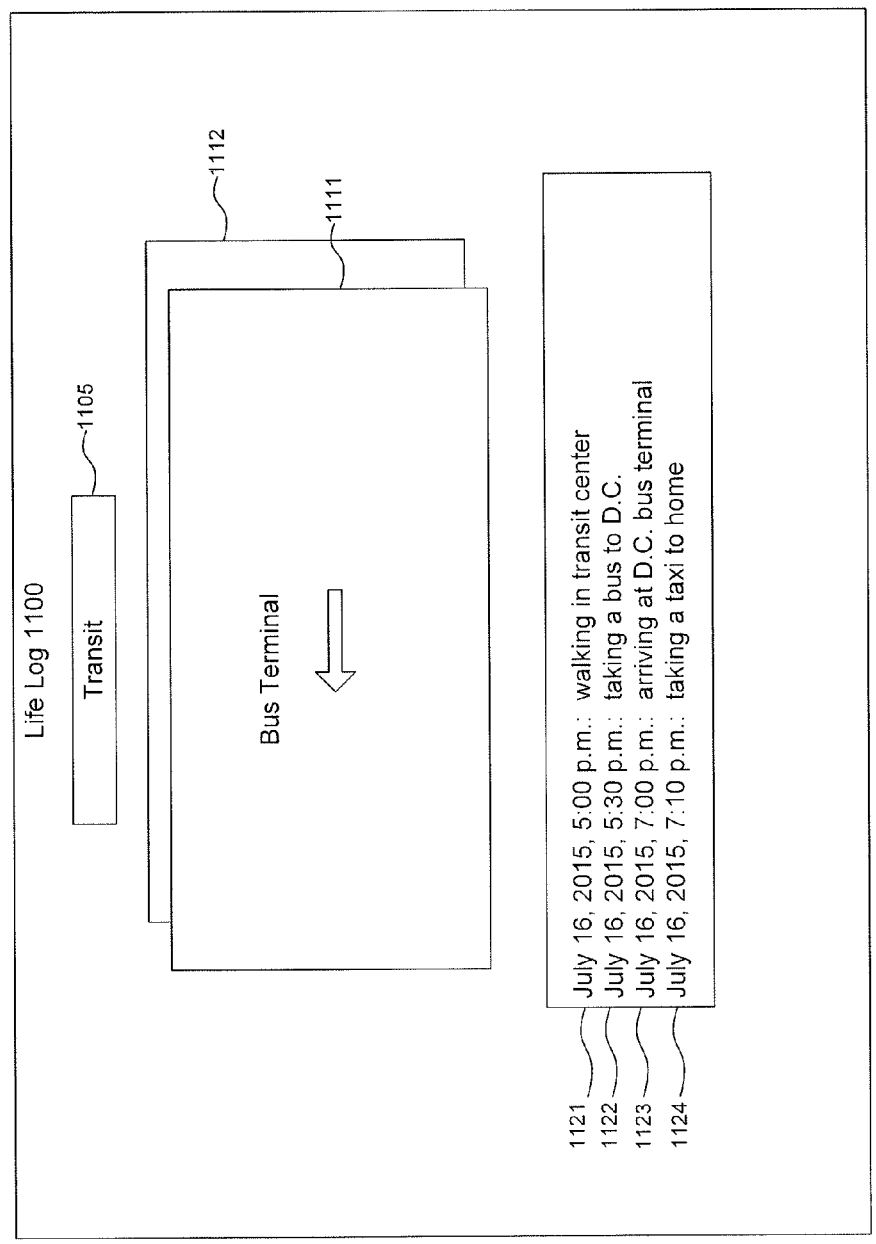
FIG. 11 shows an example life log that stores or records information relating to activities a user has performed or is performing.

FIG. 11 shows an example life log that stores or records information relating to activities user 100 has performed or is performing. Life log 1100 may be similar to life log 900, except that life log 1100 may record or store information relating to activities associated with an activity category of transit 1105. Life log 1100 may include a plurality of images captured by wearable apparatus 110 that depict activities of user 100 relating to transit. For example, life log 1100 may include a first image 1111 depicting a portion of direction sign 1000 that instructs user 100 to turn left to go to the bus terminal. Life log 1100 may include a second image 1112, which may depict another portion of direction sign 1000 that instruct user 100 to turn right to go to train stations, for example. Life log 1100 may include other images captured during the trip user 100 has taken, which may depict activities user 100 has performed on the trip. Life log 1100 may include textual entries 1121-1124. The textual entries may describe the activities relating to activity category of transit that user 100 has performed or involved. Each textual entry may include a date, time, a description of the activity, etc.

Figure 12:
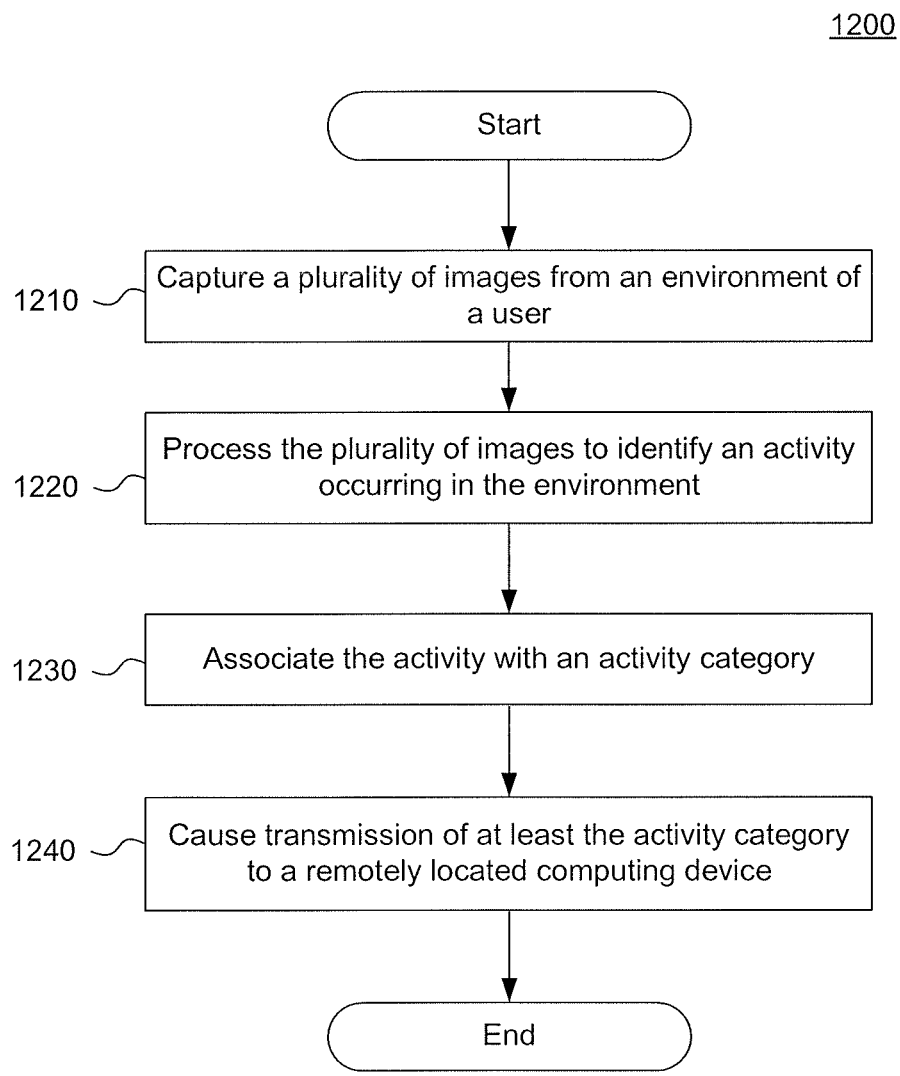
FIG. 12 is a flowchart showing an example method for capturing and processing image data.

FIG. 12 is a flowchart showing an example method 1200 for capturing and processing image data according to a disclosed embodiment. Method 1200 may be executed by various devices included in wearable apparatus 110, such as image sensor 220, 220a, and/or 220b, and at least one processing device (e.g., processor 210 and/or processor 540). Method 1200 may include capturing a plurality of images from an environment of a user (e.g., user 100) who wears wearable apparatus 110 (step 1210). For example, one or more image sensors 220, 220a, and/or 220b may capture image data of the environment of user 100. Method 1200 may include processing the plurality of images to identify an activity occurring in the environment of user 100 (step 1220). For example, the processing device may process the images to identify a soccer game occurring in the environment of user 100. In some embodiments, the processing device may identify, from the images, that user 100 has performed or is performing the activity (e.g., playing the soccer game). Method 1200 may also include associating the activity with an activity category (step 1230). For example, the processing device may associate the soccer game activity identified from the images with an activity category of sports. Method 1200 may also include causing transmission of at least the activity category to a remotely located computing device (step 1240). The transmission may be performed via a communications interface, such as wireless transceiver 530 and/or 530b. For example, the processing device may cause the activity category of sports and/or the soccer game activities to be transmitted to computing device 120 and/or server 250. Computing device 120 and/or server 250 may select a recommendation (e.g., an advertisement and/or coupon related to a merchant associated with the activity category) and transmit the recommendation to the processing device of wearable apparatus 110. In some embodiments, the processing device of wearable apparatus 110 may cause the recommendation to be output to user 100 through feedback outputting unit 230.

Method 1200 may include other steps and/or processes. For example, method 1200 may include determining, through the processing device, a location at which the activity occurred and transmitting the location to the computing device (e.g., computing device 120 and/or server 250) via the communications interface (e.g., wireless transceiver 530 and/or 530b). Method 1200 may also include transmitting, through the processing device, at least one of a plurality of images depicting the activity (e.g., soccer game) to the computing device. Method 1200 may also include causing, through the processing device, the computing device to display a life log (e.g., life log 900 and/or 1100) including at least one of the plurality of images depicting the activity (e.g., soccer game) in association with the activity category (e.g., sports).

In some embodiments, method 1200 may include determining, through the processing device, an elapsed time of the activity. Method 1200 may include transmitting, through the processing device, the elapsed time to the computing device (e.g., computing device 120 and/or server 250). Method 1200 may also include determining, through the processing device, an interest level of the user regarding the activity category (e.g., soccer game). The interest level may be determined, e.g., through the processing device, based on at least the elapsed time of the activity. For example, based on duration of time information recorded or stored in the life log (e.g., life log 900), the processing device may determine that user 100 has a high level of interest in soccer games because user 100 played the soccer game for 30 minutes, as shown in textual entry 911. The processing device may assign a number "5" to represent the high interest level. The processing device may determine that user 100 has a low level of interest in ping pong because textual entry 914 indicates that user 100 played ping pong for only 5 minutes. The processing device may assign a number "1" to represent the low interest level.

In some embodiments, method 1200 may also include determining, through the processing device, a number of activities associated with one or more activity categories that were performed by the user over a time period. For example, the processing device may analyze one or more life logs (e.g., life log 900) to determine how many sports activities user 100 has performed over a week, a month, a year, etc. As another example, the processing device may analyze one or more life log (e.g., life log 1100) to determine how many rides (of cars, buses, trains, etc.) user 100 has taken over a week, a month, a year, etc.

In some embodiments, method 1200 may include selecting, through the processing device, a recommendation for user 100 based on at least the activity category. For example, the processing device may select, from a plurality of recommendations stored in recommendation database 603, a recommendation for user 100 based on the activity category (e.g., sports) associated with the activities (e.g., soccer games) user 100 has performed. In some embodiments, the processing device may select an advertisement and/or a coupon for a merchant related to sports. The advertisement and/or coupon may be previously received by the processing device and stored in recommendation database 603.

User 100 may be interested in some activities and not interested in others. The processing device may determine an interest level of user 100 related to an activity or an activity category. In some embodiments, the processing device may cause the computing device (e.g., computing device 120 and/or server 250) to display a life log including information regarding activities associated with the activity category for which user 100 is determined to have at least a certain level of interest. In some embodiments, the processing device may cause the computing device to omit information from a life log regarding activities associated with the activity category for which user 100 is determined to have less than a certain level of interest. In some embodiments, the processing device may determine a preference of the user related to the activity, for example, based on whether user 100 deleted information related to the activity from the life log, or whether user 100 flagged information related to the activity as being not of interest. Selectively including and/or excluding information from the life log may save the storage space needed for storing the life log.

In some embodiments, the processing device may cause the computing device (e.g., computing device 120 and/or server 250) to delete information related to the activity category based on the preference of user 100. In some embodiments, the processing device may cause the computing device to include information in the life log related to a child under the user's supervision. In some embodiments, the processing device may cause the computing device to include information in the life log related to images that include text.

In some embodiments, the processing device may process the plurality of images to identify an activity occurring in the environment of user 100. The processing device may access profile information related to the user, and determine, based on the profile information, that images of the activity are to be included in a life log. The processing device may transmit at least one of the images of the activity to a remotely located computing device via the communications interface for inclusion in the life log.

In some embodiments, the processing device may select one or more coupons for user 100 based on the activity and transmit one or more identifiers of the one or more coupons to the computing device. In some embodiments, the processing device may select one or more advertisements for the user based on the activity and transmit one or more identifiers of the one or more advertisements to the computing device. For example, the identifier of the coupons and/or the advertisements may include a hyperlink pointing to the storage location (e.g., recommendation database 603) where the coupons and/or advertisements are stored.

Figure 13:
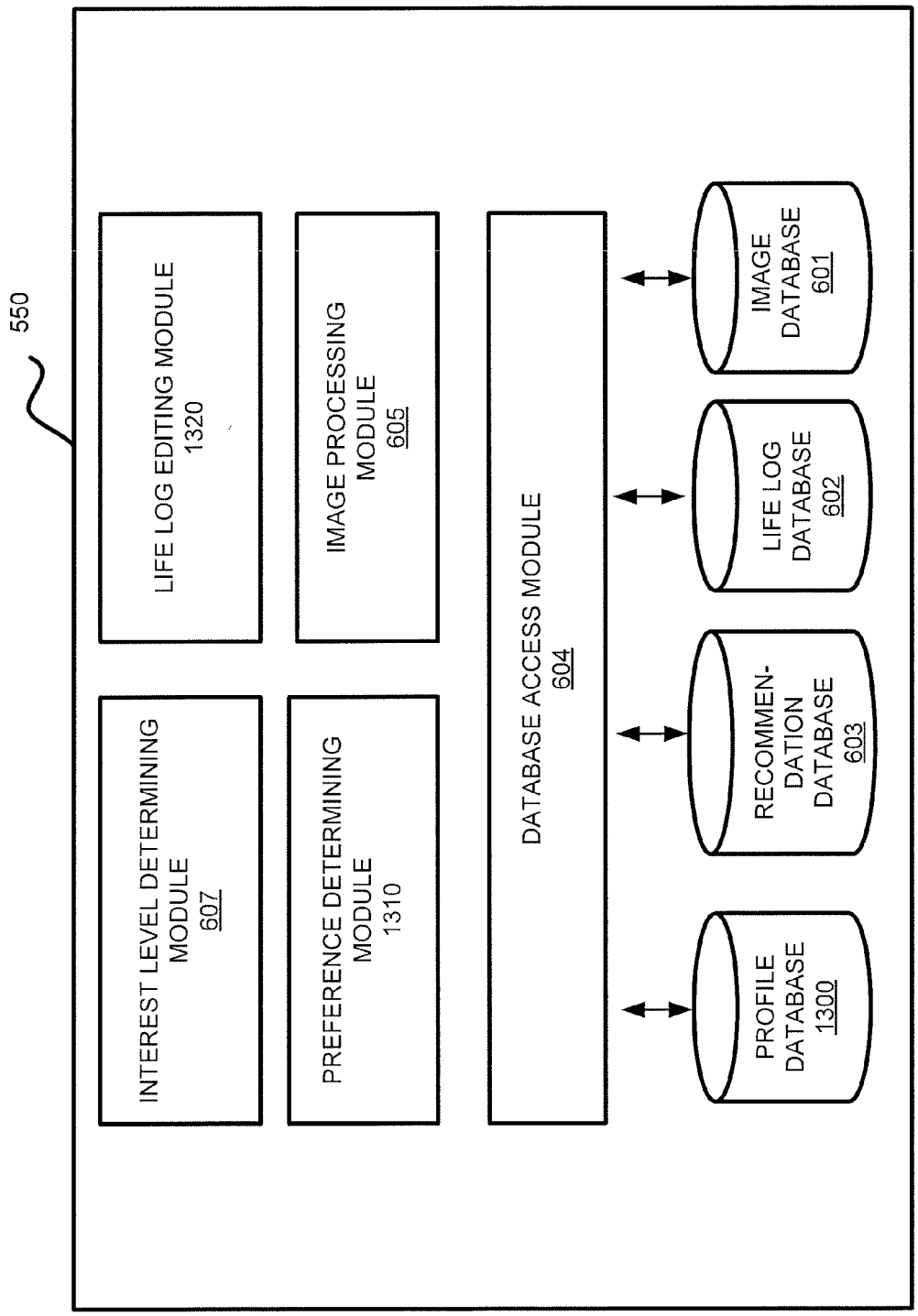
FIG. 13 is a block diagram illustrating a memory storing a plurality of modules and databases.

FIG. 13 is a block diagram illustrating a memory (e.g., memory 550, 550a, and/or 550b) according to the disclosed embodiments. Memory 550 may include databases and/or modules that are similar to those shown in FIG. 6. Thus, the descriptions of the same databases and/or modules are not repeated. Databases and/or modules shown in FIG. 13 may be combined with databases and/or modules shown in FIG. 6, or used as alternatives to the databases and/or modules shown in FIG. 6. Databases and/or modules shown in FIG. 6 may also be included in FIG. 13, or used as alternatives to the databases and/or modules shown in FIG. 13.

In the embodiment shown in FIG. 13, memory 550 is configured to store or include a profile database 1300, a preference determining module 1310, and a life log editing module 1320. Profile database 1300 may be configured to store profile information regarding user 100. Profile information may include preferences, age, gender, health condition, etc., regarding user 100. Preferences may include preferences for activity categories. For example, user 100 may prefer sports to music. Preferences may include preferences for activities within an activity category. For example, user 100 may prefer soccer to ping pong.

The processing device may execute instructions associated with preference determining module 1310 to determine a preference of user 100 based on images depicting activities user 100 has performed. For example, the processing device may determine a preference of user 100 related to an activity. Determination of the preference may be based on the duration of time user 100 was engaged in the activity, as the processing device may identify from the captured images, and/or from the life log (e.g., life log 900).

Figure 14:
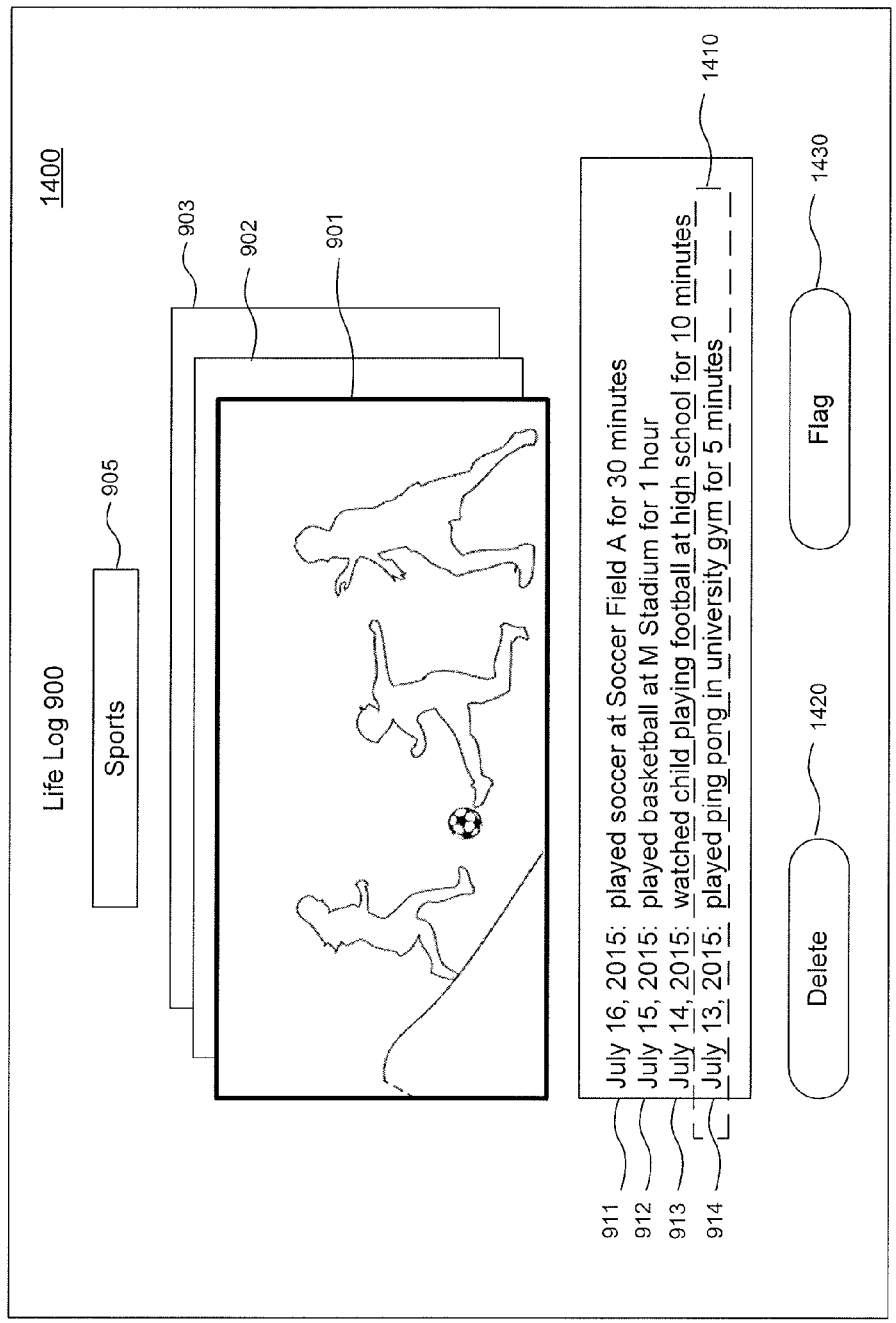
FIG. 14 is an example user interface displaying a life log on a display screen of a computing device.

FIG. 14 is an example user interface 1400 displaying life log 900 on a display screen of a computing device. In some embodiments, determination of the preference of user 100 related to the activity may be based on whether user 100 deleted information related to the activity, for example, from a life log. The processing device may execute instructions associated with life log editing module to enable user 100 to edit a life log. A life log may be displayed on a display screen of a device (e.g., computing device 120) and/or a screen associated with a device, such as server 250, as shown in FIG. 14. User interface 1400 may enable user 100 to select an image (e.g., one or more of images 901-903), and/or a textual entry (e.g., one or more textual entries 911-914) describing the images and/or activities. For example, user interface 1400 may include a touch interface that enables user 100 to touch an image so that the image is displayed in front of other images with a bold frame to indicate selection. Other methods may also be used to select an image using other data input devices (e.g., a keyboard, mouse, etc.). User interface 1400 may display a selection box 1410, which user 100 may move from one textual entry to another to select one of the textual entries 911-914. Other selection means may also be used to select a textual entry.

User interface 1400 may include a delete button 1420, which may enable user 100 to instruct the processing device associated with wearable apparatus 110, computing device 120, and/or server 250 to delete selected information, such as the selected image and/or textual entry, from life log 900 stored in life log database 602, and/or from image database 601. The deletion function may be realized using other methods. For example, a swipe input received from user 100 after an image is selected by user 100 may cause the image to be deleted. User interface may also include a flag button 1430, which when selected by user 100, enables user 100 to flag selected information, such as the selected image and/or textual entry. For example, user 100 may select image 901 and flag it, or may select textual entry 914 and flag it. Depending on implementations, flagged image and/or textual entry may be used to identify items that user 100 has no or low interest, items that user 100 prefers or has high interest, items that are important, items that are not unimportant, items that will be automatically deleted after a time period, items that will be transmitted to another life log and/or device, etc.

In some embodiments, the determination of a preference of user 100 related to a certain activity may be based on whether user 100 deleted information related to the activity. For example, if the processing device determines that user 100 deleted selected textual entry 914, which describes a ping pong activity, the processing device may determine that ping pong is not a preferred sport or activity of interest for user 100. In some embodiments, the determination of a preference of user 100 related to a certain activity may be based on whether user 100 flagged information related to the activity as being not of interest. For example, if the processing device determines that user 100 has selected textual entry 914, and flagged it (e.g., processing device receives user input on flag button 1430), the processing device may determine that user 100 is not interested in ping pong or it is not a preferred sport of activity of interest for user 100. In some embodiments, the processing device may determine that user 100 has selected textual entry 911 and flagged it as an item of high interest, and the processing device may determine that soccer is a preferred sport for user 100.

In some embodiments, at least one of the image data 601, life log database 602), profile database 1300, and/or recommendation database 603 may be stored in a memory associated with computing device 120 and/or server 250. The processing device of wearable apparatus 110 may send a signal to computing device 120 and/or server 250 to cause computing device 120 and/or server 250 to delete information, such as images, textual entries, profile information, recommendation items, etc. In some embodiments, the processing device of wearable apparatus 110 may send a signal to computing device 120 and/or server 250 to cause computing device 120 and/or server 250 to delete information related to the activity category based on the preference of user 100. For example, if user prefers sports to music, the processing device may send a signal to computing device 120 and/or server 250 to cause them to delete information (e.g., images, textual entries) related to the activity category of music.

In some embodiments, the processing device of wearable apparatus 110 may send a signal to computing device 120 and/or server 250 to cause computing device 120 and/or server 250 to include information in a life log related to a child under the supervision of user 100. For example, a child may be under supervision of user 100, and may perform various activities during a day, such as playing soccer games, playing piano, riding buses, etc. Wearable apparatus 110 may capture images depicting activities the child has performed or is performing, and may send the captured images to computing device 120 and/or server 250. The processing device may cause computing device 120 and/or server 250 to include images and/or textual entries relating to the activities performed by the child under the supervision of user 100 in a life log of the child, and/or in a life log of user 100.

In some embodiments, the processing device of wearable apparatus 110 may send a signal to computing device 120 and/or server 250 to cause computing device 120 and/or server 250 to include information in a life log related to images that include text. For example, referring back to FIG. 11, wearable apparatus 110 may capture image 1111 at a transit center, which includes the text "Bus Terminal." The processing device may send the image to computing device 120 and/or server 250, and cause computing device 120 and/or server 250 to include information (e.g., the image, and/or text "Bus Terminal" extracted from the image) in life log 1100.

Figure 15:
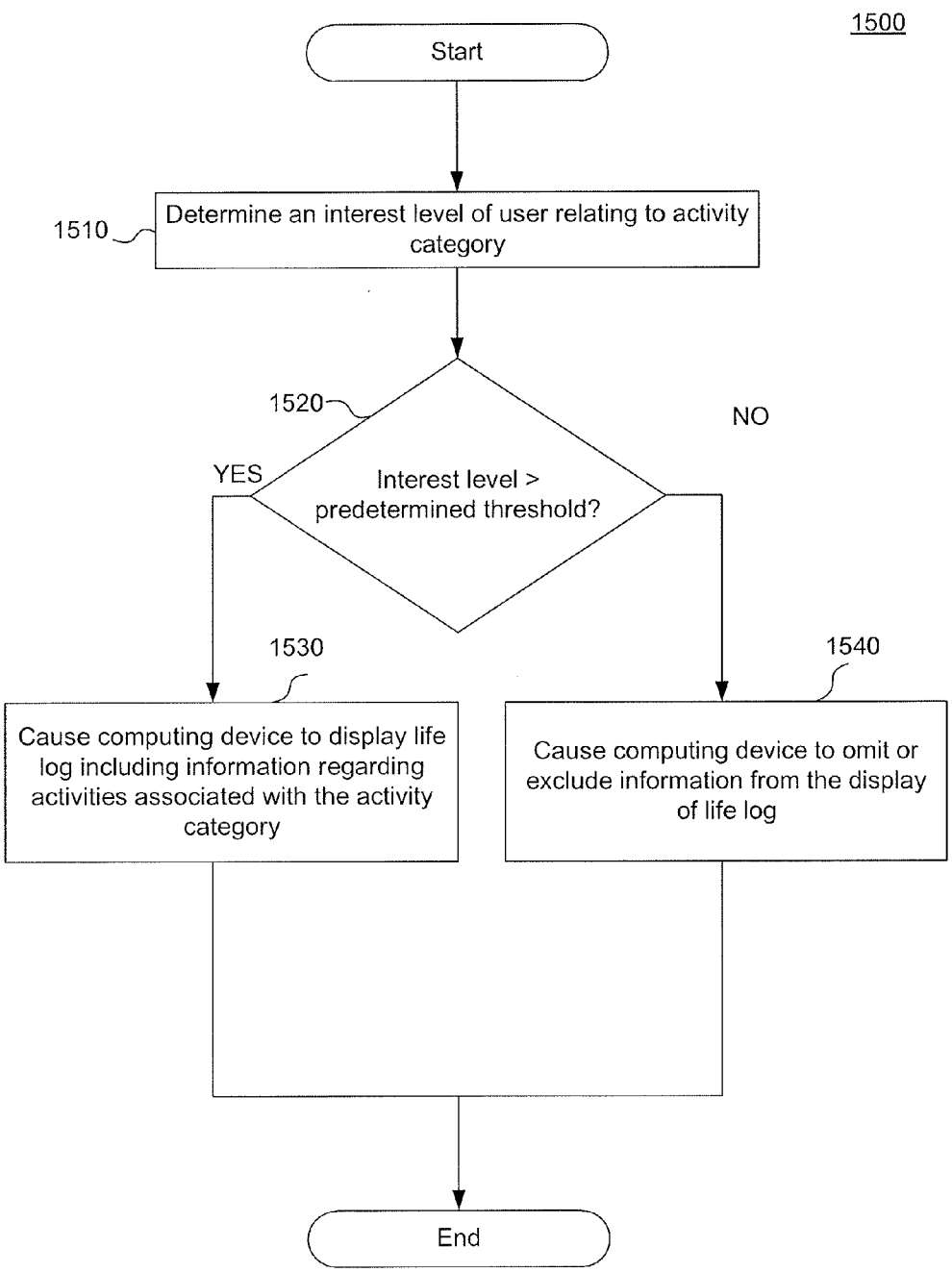
FIG. 15 is a flowchart showing an example method for processing information based on a level of interest.

FIG. 15 is a flowchart showing an example method 1500 for processing information based on a level of interest. Method 1500 may be executed by various devices included in wearable apparatus 110, such as image sensor 220, 220*a*, and/or 220*b*, and at least one processing device (e.g., processor 210 and/or processor 540). Method 1500 may include determining an interest level of user 100 relating to an activity category (step 1510). For example, the processing device may determine an interest level of user 100 relating to an activity category of sports, an activity category of music, and/or an activity category of transit. The interest level may be represented by a number, such as "1" to "5," with a higher number indicating a higher interest level. Other methods, such as symbols, alphabets, may also be used to represent the interest level.

Method 1500 may include determining whether the interest level is greater than a predetermined threshold (step 1520). The predetermined threshold may be, for example, "2." When the processing device determines that the interest level is higher than the predetermined threshold (Yes, step 1520), method 1500 may include causing a computing device to display a life log including information regarding activities associated with one or more activity categories for which the user has a level of interest (or interest level) that is higher than the predetermined threshold (step 1530). For example, when the processing device determines that user 100 has an interest level of 4 in activity categories of sports and music, which is higher than the predetermined threshold of 2, the processing device may cause computing device 120 and/or server 250 to display a life log (e.g., life log 900 and/or another life log recording activities relating to music) that include information (e.g., images and/or textual entries) regarding activities (e.g., soccer games, basketball games, concert) associated with the sports and music activity categories.

When the processing device determines that the interest level is higher than the predetermined threshold (No, step 1520), method 1500 may include causing a computing device to omit information from a life log regarding activities associated with one or more activity categories for which the user has an interest level less than or equal to the predetermined threshold (step 1540). For example, when the processing device determines that user 100 has an interest level of 1, which is higher than the predetermined threshold of 2, in activity category of transit, the processing device may cause computing device 120 and/or server 250 to omit, from a life log, information (e.g., images and/or textual entries) regarding activities (e.g., riding buses, riding trains) associated with the transit activity category.

In some embodiments, the processing device may be programmed to cause computing device 120 and/or server 250 to include or exclude information from a life log (e.g. life log 900 and/or 1100) regarding activities associated with one or more activity categories based on the determined interest level. If user 100 has a high interest level in an activity, or in activities of a category, the processing device may cause computing device 120 and/or server 250 to include information (e.g., images and/or textual entries) in a life log. If user has a low interest level in an activity or in activities of a category, the processing device may cause computing device 120 and/or server 250 to exclude information (e.g., images and/or textual entries) in a life log.

Figure 16:
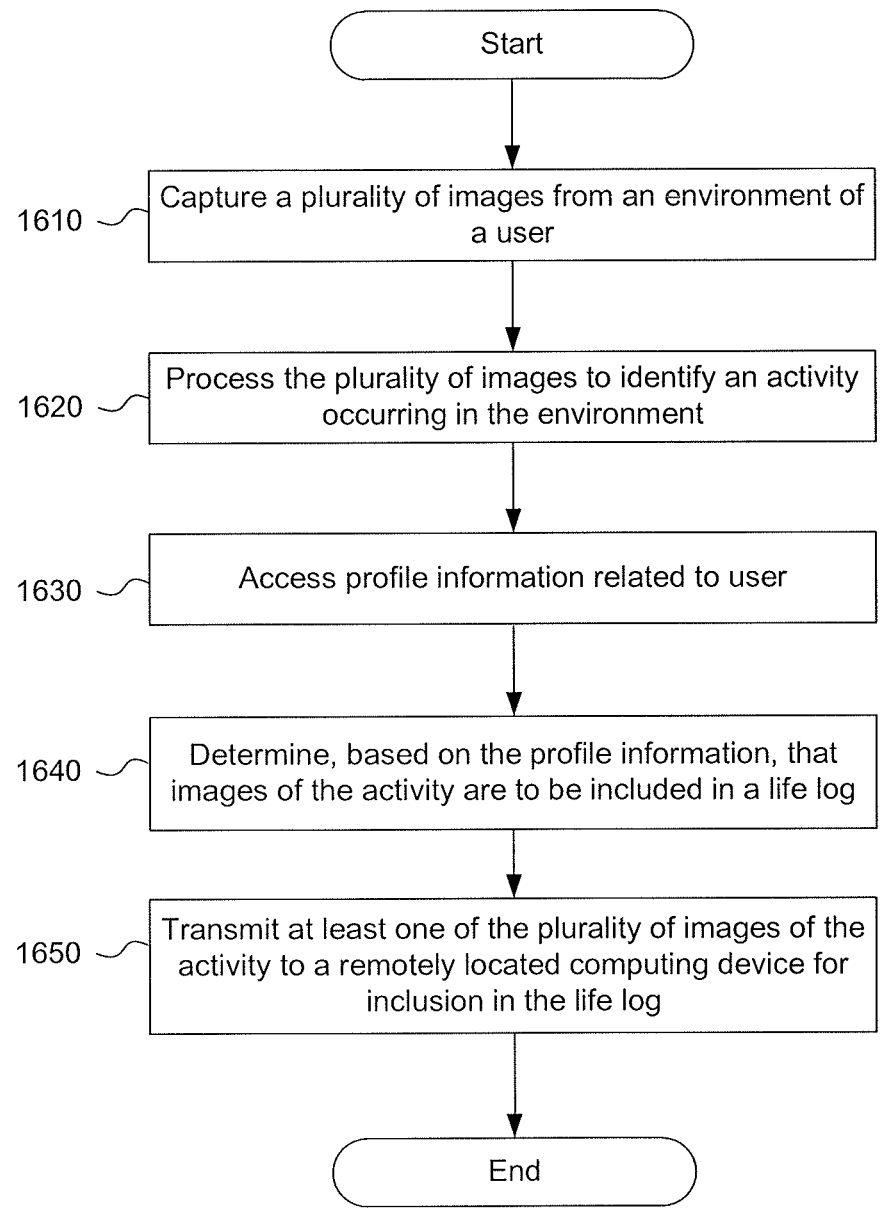
FIG. 16 is a flowchart showing an example method for capturing and processing image data.

FIG. 16 is a flowchart showing an example method 1600 for capturing and processing image data according to a disclosed embodiment. Method 1600 may be executed by various devices included in wearable apparatus 110, such as image sensor 220, 220a, and/or 220b, and at least one processing device (e.g., processor 210 and/or processor 540). Method 1600 may include capturing a plurality of images from an environment of user 100 (step 1610). For example, one or more image sensors 220, 220a, and/or 220b may capture image data of the environment of user 100. Method 1600 may include processing the plurality of images to identify an activity occurring in the environment (step 1620). For example, the processing device may process the images to identify a soccer game occurring in the environment of user 100. Method 1600 may include accessing profile information related to user 100 (step 1630). For example, the processing device may access profile database 1300 to read or retrieve profile information relating to user 100, such as user's age, gender, health condition, etc. Method 1600 may include determining, based on the profile information, that images of the activity are to be included in a life log (step 1640). For example, the processing device may determine, based on profile information indicating that doctors have asked user 100 to exercise during each day, that images depicting user 100 performing sports activities are to be included in a life log of user 100. Method 1600 may also include transmitting at least one of the images of the activity to a remotely located computing device for inclusion in the life log (step 1650). For example, life log database 602 may be stored in a memory associated with a remotely located computing device, such as computing device 120 and/or server 250. The processing device may transmit at least one of the images depicting activities user 100 has performed to computing device 120 and/or server 250 for storage in life log database 602.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A wearable apparatus for collecting information related to activities of a user, the wearable apparatus comprising:
    an image sensor configured to capture a plurality of images from an environment of the user;
    a communications interface; and
    at least one processing device programmed to:
        process the plurality of images to identify an activity occurring in the environment of the user;
        associate the activity with an activity category;
        determine, based on the plurality of images, a level of interest of the user in the activity category, wherein the level of interest is based, at least in part, on a duration of the activity;
        cause transmission of at least the activity category to a remotely located computing device via the communications interface; and
        cause a life log to be stored in memory, the life log including information comprising at least part of at least one of the plurality of images depicting the activity and the activity category associated with the at least one of the plurality of images, wherein the information stored in the life log is selectively included based on at least the level of interest of the user in the activity category exceeding a predetermined threshold.

2. The wearable apparatus of claim 1, wherein the at least one processing device is further programmed to determine a location at which the activity occurred and to transmit the location to the computing device via the communications interface.

3. The wearable apparatus of claim 1, wherein the at least one processing device is further programmed to transmit at least one of the plurality of images depicting the activity to the computing device.

4. The wearable apparatus of claim 3, wherein the at least one processing device is further programmed to cause the computing device to display at least one of the plurality of images depicting the activity in association with the activity category.

5. The wearable apparatus of claim 1, wherein the at least one processing device is further programmed to determine an elapsed time of the activity, and the at least one processing device is further programmed to transmit the elapsed time to the computing device.

6. The wearable apparatus of claim 5, wherein the at least one processing device is further programmed to determine an interest level of the user regarding the activity category.

7. The wearable apparatus of claim 1, wherein the at least one processing device is further programmed to determine a number of activities associated with one or more activity categories that were performed by the user over a time period.

8. The wearable apparatus of claim 1, wherein the at least one processing device is further programmed to select a recommendation for the user based on at least the activity category.

9. The wearable apparatus of claim 1, wherein the at least one processing device is further programmed to select at least one of an advertisement and a coupon for presenting to the user based on at least the activity category.

10. The wearable apparatus of claim 1, wherein the at least one processing device is further programmed to receive at least one of an advertisement and a coupon for presenting to the user based on at least the activity category.

11. The wearable apparatus of claim 1, wherein the at least one processing device is further programmed to determine an interest level of the user related to one or more activity categories.

12. The wearable apparatus of claim 11, wherein the at least one processing device is further programmed to cause the computing device to display information regarding activities associated with one or more activity categories for which the user is determined to have at least a certain level of interest.

13. The wearable apparatus of claim 11, wherein the at least one processing device is further programmed to cause the computing device to omit information from the life log regarding activities associated with one or more activity categories for which the user is determined to have less than a certain level of interest.

14. The wearable apparatus of claim 11, wherein the at least one processing device is further programmed to cause the computing device to include or exclude information from the life log regarding activities associated with one or more activity categories based on the determined interest level.

15. The wearable apparatus of claim 1, wherein the at least one processing device is further programmed to determine a preference of the user related to the activity.

16. The wearable apparatus of claim 15, wherein determination of the preference of the user related to the activity is based on whether the user deleted information related to the activity.

17. The wearable apparatus of claim 15, wherein determination of the preference of the user related to the activity is based on whether the user flagged information related to the activity as being not of interest.

18. The wearable apparatus of claim 15, wherein the at least one processing device is further programmed to cause the computing device to delete information related to the activity category based on the preference of the user.

19. The wearable apparatus of claim 12, wherein the at least one processing device is further programmed to cause the computing device to include information in the life log related to a child depicted in one or more of the plurality of images and under the user's supervision.

20. The wearable apparatus of claim 12, wherein the at least one processing device is further programmed to cause the computing device to include information in the life log related to images that include text.

21. A wearable apparatus for collecting information related to activities of a user, the wearable apparatus comprising:
an image sensor configured to capture a plurality of images from an environment of the user;
a communications interface; and
at least one processing device programmed to:
process the plurality of images to identify an activity occurring in the environment of the user, wherein the activity is associated with an activity category;
access profile information related to the user to obtain a level of interest of the user in the activity category, wherein the level of interest is based, at least in part, on a duration of the activity determined thorough analysis of the plurality of images;
determine, based on at least the level of interest of the user in the activity category exceeding a predetermined threshold, that images of the activity are to be included in a life log stored in memory; and
based on the determination, transmit at least part of at least one of the plurality of images of the activity to a remotely located computing device via the communications interface for inclusion in the life log.

22. The wearable apparatus of claim 21, wherein the at least one processing device is programmed to select one or more coupons for the user based on the activity and transmit one or more identifiers of the one or more coupons to the computing device.

23. The wearable apparatus of claim 21, wherein the at least one processing device is programmed to select one or more advertisements for the user based on the activity and transmit one or more identifiers of the one or more advertisements to the computing device.

24. A method for collecting information related to activities of a user, the method comprising:
capturing, via an image sensor included in a wearable apparatus, a plurality of images from an environment a user of the wearable apparatus;
processing the plurality of images to identify an activity occurring in the environment of the user;
associating the activity with an activity category;
determining, based on the plurality of images, a level of interest of the user in the activity category, wherein the level of interest is based, at least in part, on a duration of the activity;
transmitting at least the activity category to a remotely located computing device; and
causing a life log to be stored in memory, the life log including information comprising at least part of at least one of the plurality of images depicting the activity and the activity category associated with the at least one of the plurality of images, wherein the information stored in the life log is selectively included based on at least the level of interest of the user in the activity category exceeding a predetermined threshold.

25. A non-transitory computer readable medium storing computer implementable instructions for carrying out the method of claim 24.

* * * * *